United States Patent
Kiciman et al.

(10) Patent No.: US 10,692,093 B2
(45) Date of Patent: Jun. 23, 2020

(54) SOCIAL HOME PAGE

(75) Inventors: Emre Mehmet Kiciman, Seattle, WA (US); Chun-Kai Wang, Bellevue, WA (US); Sreeharsha Kamireddy, Redmond, WA (US); Silviu-Petru Cucerzan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 826 days.

(21) Appl. No.: 12/761,666

(22) Filed: Apr. 16, 2010

(65) Prior Publication Data

US 2011/0258556 A1 Oct. 20, 2011

(51) Int. Cl.
G06F 3/0481 (2013.01)
G06Q 30/02 (2012.01)
G06Q 10/10 (2012.01)
H04W 4/21 (2018.01)

(52) U.S. Cl.
CPC .......... *G06Q 30/02* (2013.01); *G06F 3/0481* (2013.01); *G06Q 10/10* (2013.01); *H04W 4/21* (2018.02)

(58) Field of Classification Search
CPC ...... G06F 17/278; G06F 3/048; G06F 3/0481; G06F 3/04817; G06F 3/0484; G06Q 50/01; G06Q 10/10; G06Q 30/02; H04W 4/206
USPC ......................................................... 715/751
See application file for complete search history.

(56) References Cited

U.S. PATENT DOCUMENTS

| | | | |
|---|---|---|---|
| 5,493,677 A * | 2/1996 | Balogh et al. | 382/305 |
| 7,092,901 B2 | 8/2006 | Davis et al. | |
| 7,599,938 B1 | 10/2009 | Harrison, Jr. | |
| 7,599,950 B2 | 10/2009 | Walther et al. | |
| 2004/0148222 A1 | 7/2004 | Sabella et al. | |
| 2005/0165743 A1 | 7/2005 | Bharat et al. | |
| 2005/0289468 A1* | 12/2005 | Kahn et al. | 715/738 |
| 2006/0048059 A1* | 3/2006 | Etkin | 715/745 |

(Continued)

FOREIGN PATENT DOCUMENTS

| JP | 2000311040 A | 11/2000 |
|---|---|---|
| JP | 2009169924 A | 7/2009 |

(Continued)

OTHER PUBLICATIONS

"International Search Report", dated Dec. 7, 2011, Application No. PCT/US2011/031035, Filed Date: Apr. 4, 2011, pp. 8.

(Continued)

*Primary Examiner* — Amy Ng
*Assistant Examiner* — William Wong
(74) *Attorney, Agent, or Firm* — Medley, Behrens & Lewis, LLC

(57) ABSTRACT

Technologies pertaining to the creation of personalized data for an individual, including personalized data based on a social networking participant's social networking data, entity extraction, and automatic collage generation are described herein. In one implementation, the personalized data is used to provide a personalized, social-based replacement for a default UI element. In one implementation, a disambiguated named entity is extracted from user generated content in a social networking application, a socially interesting photomontage is automatically generated based on photographs from a social networking application, and the photomontage is rendered with hotspots containing socially relevant annotations.

20 Claims, 21 Drawing Sheets

(56) References Cited

U.S. PATENT DOCUMENTS

| | | | |
|---|---|---|---|
| 2006/0085515 A1* | 4/2006 | Kurtz et al. | 709/207 |
| 2006/0143183 A1* | 6/2006 | Goldberg | G06F 17/3089 |
| 2006/0242178 A1* | 10/2006 | Butterfield | G06F 17/30038 |
| 2007/0016609 A1* | 1/2007 | Kim et al. | 707/104.1 |
| 2007/0043688 A1 | 2/2007 | Kountz et al. | |
| 2007/0067285 A1* | 3/2007 | Blume et al. | 707/5 |
| 2007/0106627 A1* | 5/2007 | Srivastava et al. | 706/20 |
| 2007/0130276 A1* | 6/2007 | Zhang et al. | 709/207 |
| 2007/0143264 A1* | 6/2007 | Szeto | 707/3 |
| 2007/0162432 A1* | 7/2007 | Armstrong et al. | 707/3 |
| 2007/0192300 A1 | 8/2007 | Reuther et al. | |
| 2007/0233564 A1* | 10/2007 | Arnold | 705/14 |
| 2007/0233656 A1* | 10/2007 | Bunescu | G06F 17/278 |
| 2008/0005064 A1 | 1/2008 | Sarukkai | |
| 2008/0040673 A1* | 2/2008 | Zuckerberg et al. | 715/745 |
| 2008/0065604 A1* | 3/2008 | Tiu et al. | 707/3 |
| 2008/0065621 A1 | 3/2008 | Ellis | |
| 2008/0082905 A1* | 4/2008 | Martinez et al. | 715/205 |
| 2008/0132252 A1* | 6/2008 | Altman et al. | 455/457 |
| 2008/0133258 A1* | 6/2008 | Kontogouris | 705/1 |
| 2008/0133488 A1* | 6/2008 | Bandaru et al. | 707/3 |
| 2008/0133649 A1* | 6/2008 | Pennington et al. | 709/203 |
| 2008/0195657 A1* | 8/2008 | Naaman et al. | 707/104.1 |
| 2008/0208864 A1 | 8/2008 | Cucerzan et al. | |
| 2008/0209010 A1* | 8/2008 | Zitnick, III et al. | 709/219 |
| 2008/0209343 A1* | 8/2008 | Macadaan et al. | 715/747 |
| 2008/0235592 A1* | 9/2008 | Trauth | 715/733 |
| 2008/0275861 A1* | 11/2008 | Baluja et al. | 707/5 |
| 2008/0313147 A1 | 12/2008 | Svore et al. | |
| 2009/0083278 A1* | 3/2009 | Zhao et al. | 707/10 |
| 2009/0132933 A1* | 5/2009 | Faski | G06Q 10/10 715/753 |
| 2009/0144609 A1* | 6/2009 | Liang et al. | 715/230 |
| 2009/0148064 A1 | 6/2009 | Schulz | |
| 2009/0150388 A1* | 6/2009 | Roseman et al. | 707/5 |
| 2009/0157593 A1* | 6/2009 | Hayashi | G06Q 10/10 |
| 2009/0210793 A1* | 8/2009 | Yee et al. | 715/723 |
| 2009/0217145 A1* | 8/2009 | Watson | 715/202 |
| 2009/0222482 A1* | 9/2009 | Klassen et al. | 707/104.1 |
| 2009/0234815 A1* | 9/2009 | Boerries et al. | 707/3 |
| 2009/0235155 A1 | 9/2009 | Ueda | |
| 2009/0271388 A1 | 10/2009 | Murdock et al. | |
| 2010/0050090 A1* | 2/2010 | Leebow | 715/751 |
| 2010/0100607 A1* | 4/2010 | Scholz | G06F 17/30702 709/219 |
| 2010/0125563 A1* | 5/2010 | Nair | G06Q 30/02 707/709 |
| 2010/0174993 A1* | 7/2010 | Pennington et al. | 715/738 |
| 2010/0293195 A1* | 11/2010 | Houghton | G06F 17/241 707/776 |
| 2011/0004831 A1* | 1/2011 | Steinberg et al. | 715/753 |
| 2011/0035406 A1* | 2/2011 | Petrou | G06F 16/434 707/769 |
| 2012/0101897 A1* | 4/2012 | Vital, III | G06Q 30/02 705/14.49 |

FOREIGN PATENT DOCUMENTS

| | | | |
|---|---|---|---|
| JP | 2010532027 | A | 9/2010 |
| KR | 1020100006752 | A | 1/2010 |
| RU | 2008137078 | A | 3/2010 |
| TW | 200846951 | A | 12/2008 |
| WO | 2008154648 | A1 | 12/2008 |
| WO | 2009088671 | A1 | 7/2009 |

OTHER PUBLICATIONS

Zimmer, Michael, "The Panoptic Gaze of Web Search Engines: Google Infrastructure of Dataveillance", Retrieved at << http://michaelzimmer.org/files/Zimmer_Panoptic_Gaze_of_Search_Engines.pdf >>, National Communication Association Conference, Nov. 19, 2006, pp. 1-48.

Jeon, et al., "Automatic Image Annotation of News Images with LargeVocabularies and Low Quality Training Data", Retrieved at << http://maroo.cs.umass.edu/pdf/MM-368.pdf >>, In Proceedings of ACM Multimedia, 2004, pp. 8.

Cucerzan, Silviu, "Large-Scale Named Entity Disambiguation Based on Wikipedia Data", Retrieved at << http://acl.ldc.upenn.edu/D/D07/D07-1074.pdf >>, In The EMNLP-CoNLL Joint Conference, Jun. 2007, pp. 9.

Kiciman, et al., "Social Browsing", U.S. Appl. No. 12/614,457, filed Nov. 9, 2009.

Kiciman, et al., "Generating Activities Based Upon Social Data", U.S. Appl. No. 12/633,798, filed Dec. 9, 2009.

"Patent Examination Report No. 1", Patent Application No. 2011240962, IP Australia, dated Feb. 19, 2014, 3 Pages.

"Second Office Action Issued in Chinese Patent Application No. 201180019377.6", dated Feb. 17, 2014, Filed Date: Apr. 4, 2011, 7 Pages.

"Search Report Issued in European Patent Application No. 11769292.1", dated Mar. 19, 2014, Filed Date: Apr. 4, 2011, 6 Pages.

"Notice of Allowance Issued in Australian Patent Application No. 2011240962", dated May 2, 2014, Filed Date: Apr. 4, 2011, 2 Pages.

"Office Action Received for Chinese Patent Application No. 201180019377.6", dated Jul. 3, 2014, 6 Pages.

"Reexamination Decision for Chinese Patent Application No. 201180019377.6", dated Jan. 15, 2016, 9 pages.

"Response to the Notice of Reexamination for Chinese Patent Application No. 201180019377.6", Filed Date: Oct. 19, 2015, 23 pages.

"Third Office Action and Search Report Issued in Chinese Patent Application No. 201180019377.6", dated Feb. 4, 2017, 12 Pages.

"Response to the Office Action for European Patent Application No. 11769292.1", Filed Date: Apr. 10, 2017, 11 Pages.

"Office Action Issued in European Patent Application No. 11769292.1", dated Sep. 30, 2016, 5 Pages.

"Office Action Issued in Korean Patent Application No. 10-2012-7026812", dated May 2, 2017, 6 Pages. (W/o English Translation).

* cited by examiner

SOCIAL HOME PAGE

CROSS-REFERENCE TO RELATED APPLICATION(S)

This application is related to U.S. patent application Ser. No. 11/710,805, filed Feb. 26, 2007, titled AUTOMATIC DISAMBIGUATION BASED ON A REFERENCE RESOURCE, which is incorporated herein by reference in its entirety;
This application is related to U.S. patent application Ser. No. 11/818,088, filed Jun. 13, 2007, titled Multi-Level Search, which is incorporated herein by reference in its entirety;
This application is related to U.S. patent application Ser. No. 12/614,457, filed Nov. 9, 2009, titled SOCIAL BROWSING, which is incorporated herein by reference in its entirety;
This application is related to U.S. patent application Ser. No. 12/633,798, filed Dec. 9, 2009, titled GENERATING ACTIVITIES BASED UPON SOCIAL DATA, which is incorporated herein by reference in its entirety.

BACKGROUND

Online social network applications are becoming increasingly popular. People rely on such applications to keep in touch and interact with friends and family. Typically, to utilize such an online social networking application, an individual that logs into a web site that corresponds to the application will be provided a visual depiction of messages sent to the individual as well as status updates of contacts (friends) of the individual.

While these online social networking applications are useful tools that allow people to interact with their contacts, often times messages transmitted using social networking applications are relatively short with little context associated with them. Thus, an assumption exists that an individual receiving a relatively short message will have some knowledge of what the sender of the message is referring to in the message.

SUMMARY

The following is a brief summary of subject matter that is described in greater detail herein. This summary is not intended to be an extensive overview of the disclosure, is not intended to identify either key/critical elements of the claims or disclosure, is not intended to delineate the scope of the invention, and is not intended to be limiting as to the scope of the claims or the disclosure.

Described herein are various technologies pertaining to creation of personalized data for an individual. More particularly, described herein are various technologies pertaining to automatically providing personalized data based on a social networking participant's social networking data.

In one example, when a social networking participant comes to a search engine home page, along with the usual search bar and logo, the page can be annotated with information from the news feed(s) from the social networking participant's social network(s). For example, one can show a collage of recent pictures or videos posted by friends, along with hotspots or links to interesting information from users' comments. The annotation may also be a mashup with other sources, such as an online knowledge collection such as WIKIPEDIA, along with ads or tasks (e.g., a picture of Hawaii could be annotated with information about Hawaii and a link for planning a trip to the islands).

Other aspects will be appreciated upon reading and understanding the attached figures and description.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
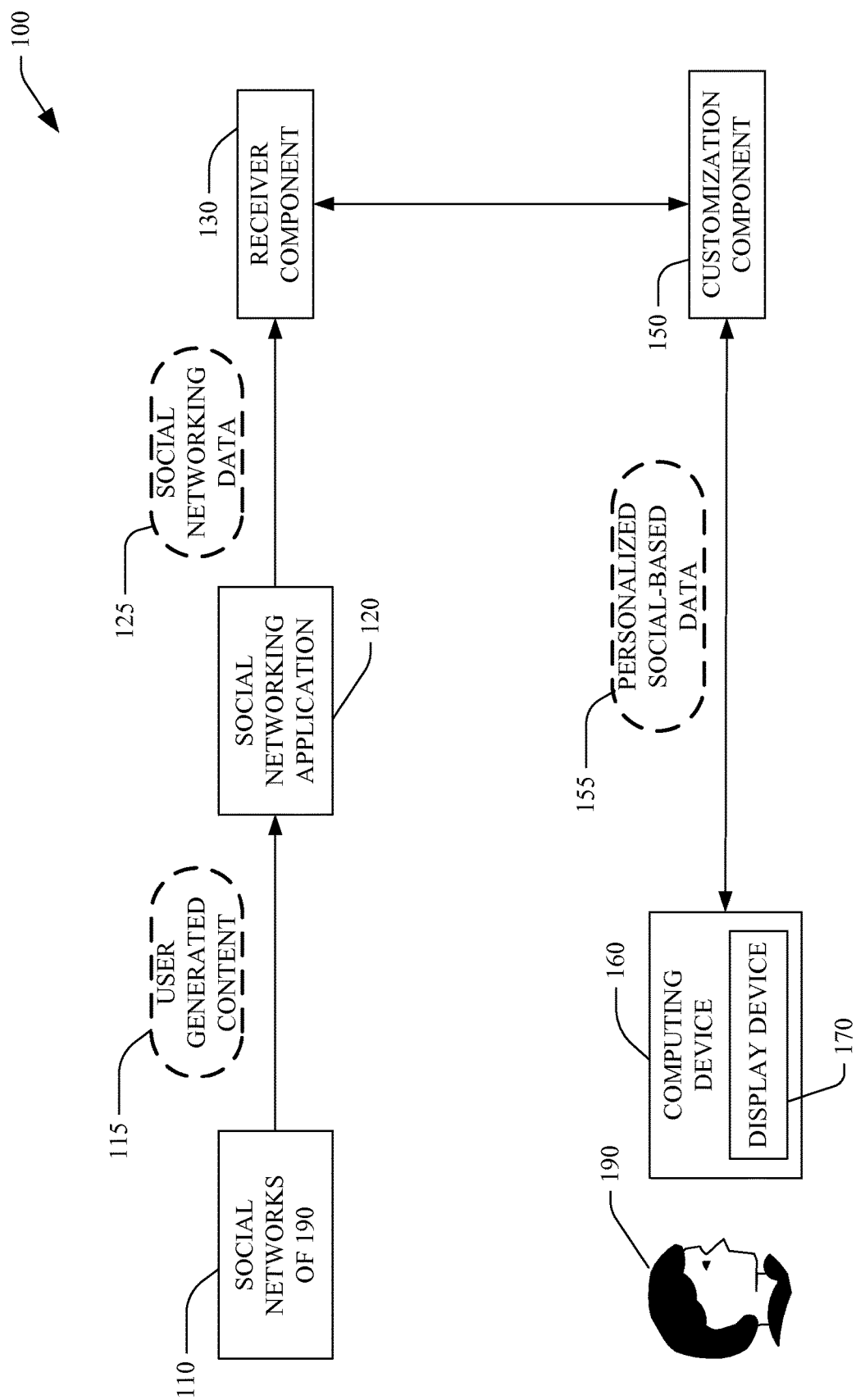
FIG. 1 illustrates an example generalized functional block diagram of an example system that provides personalized data based on social networking data.

The detailed description provided below in connection with the appended drawings is intended as a description of the present examples and is not intended to represent the only forms in which the present example may be constructed or utilized.

Any example in text, visual, or other form is provided as an example, and without limitation. It should be recognized that, for examples with multiple options given in either alternative (or) or combination (and) form, not all such options are necessarily essential. Furthermore, any, all, or none of those options may be used in combinations not explicitly listed. The terms "include only" and "includes only" are limiting. In contrast, the terms "include" and "includes" are not limiting, and should be read as "include, without limitation," or "includes, without limitation" respectively. The term "in one implementation" is not limiting, and should be read as "in at least one implementation, without limitation,". The terms "e.g.", "such as", and "for example" are not limiting, and should be read as "In at least one example, without limitation". The term "may" is not limiting, and should be read as "may, but is not required to,". However, for readability, the shorter forms of these expressions may be used below.

The description sets forth the functions of the examples and the sequence of steps for constructing and operating the examples. However, the same or equivalent functions and sequences may be accomplished by different examples.

While example operational flows are shown as including multiple discrete steps or acts, it should be recognized that in some implementations at least some steps or acts may be combined or executed contemporaneously. It should also be recognized that not all steps or acts described in a given sequence are necessarily essential, that functionality that is described as being carried out by certain system components may be performed by multiple components, and that a single component may be configured to perform functionality that is described as being carried out by multiple components.

Although aspects described herein may be described in relation to photographs or images, a person having ordinary skill in the art will recognize that these aspects may also be applicable to photographs, any other type of image, video, audio, tactile, and olfactory data.

The descriptions of each of the figures below may be made with reference to other figures. However, it should be understood that these references to other figures are not intended to limit the examples to being used with the elements described with reference to those other figures.

Although the present examples may be described and illustrated herein as being implemented in a computing system, the system described is provided as an example and not a limitation. As those skilled in the art will appreciate, the present examples are suitable for application in a variety of different types of computing systems.

An example implementation will first be described with some example generalized input and at least portions of the process to reach a result. References will be made to figures and elements in figures which may be described in more detail following this example.

In this example, the social networking participant 190 can view a photograph 405 on a social networking application 120, and the photograph 405 was uploaded by someone in their social networks 110. The photograph 405 shows one of the individual's friends snorkeling, with the photograph having a caption 410 of "Just off the island". A first comment 425 from one friend says "you look great in that snorkel", corresponding the comment to an area 475 of the photograph 405. A second comment 435 from a second friend says "that's some crater". A third comment 445 from a third friend says "i love the valley isle".

Continuing this example, none of the user generated content 405, 410, 425 and 475, 435, and 445, if analyzed separately, may contain sufficient information to determine a proper named entity. However, analysis of the group of comments, tied together through the social networking data, may indicate a proper named entity as described in more detail below.

Continuing this example, a search for the term "valley isle" (from comment 445) reveals that this is a local name for the island of Maui in Hawaii, via a WIKIPEDIA online knowledge collection entry. The online knowledge collection entry also has links to multiple locations that are favorite snorkeling destinations (considered based on the term "snorkel" in comment 425). One of these links is to Molokini.

Continuing this example, the online knowledge collection entry for Molokini indicates that the site is a volcanic crater. Since the term "crater" is also found in comment 435, this increases the probability that the location was Molokini. The online knowledge collection entry for Molokini also indicates that Molokini is only 2.5 miles off the coast of Maui. Since the caption 410 for the photograph was "just off the island", this increases the probability that the location was Molokini.

Continuing this example, by piecing these multiple contextual clues together, the customization component 150 chooses a resulting annotation phrase of "you look great in that snorkel", a named entity of "Molokini", a disambiguated named entity of "Molokini Island Preserve (Molokini Marine Life Conservation District)", each with an indication of a high probability of correctness.

Figure 16:
FIG. 16 illustrates an example generalized socially relevant collage with two hotspots.

FIG. 16 illustrates a continuation of this example, where the image selection component 930 then selects the photograph 405 that shows the friend snorkeling based on the high score. Based on an exclusion mask 1001, at least the portion 475 is included in a generated socially relevant collage 1601. The hotspot generator component 960 generates a hotspot 1660 at the location of the portion 475 in the resulting collage 1601. A second hotspot 1630 is also generated for a portion of a video 575. Both hotspots are shown as fully visible for clarity.

Figure 17:
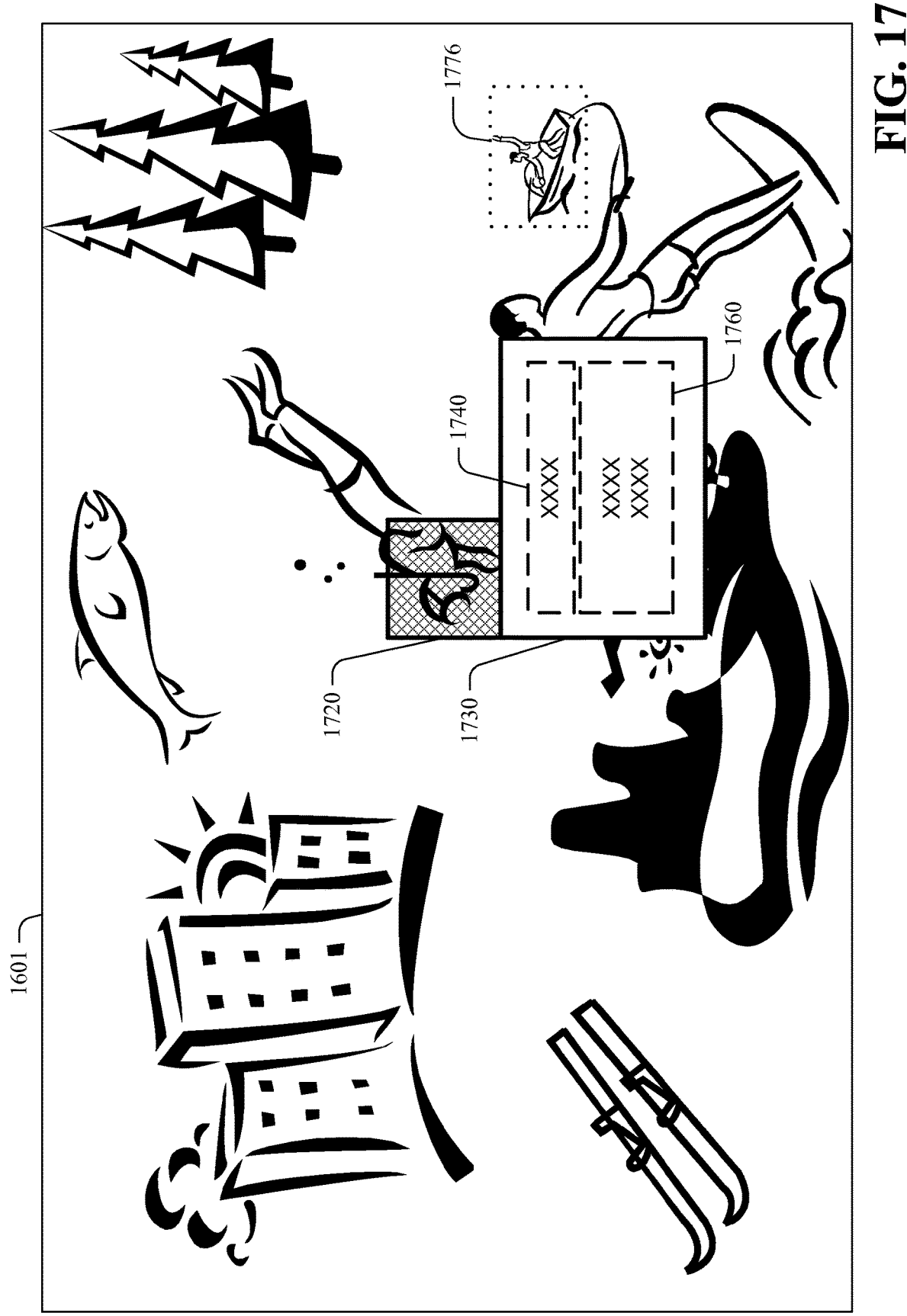
FIG. 17 illustrates an example generalized socially relevant collage with an activated hotspot showing an annotation area.

FIG. 17 illustrates a continuation of this example, where the non-activated hotspot 1776 is illustrated as not fully visible through the use of dots outlining the hotspot. When displayed, the non-activated hotspot 1776 appears for one second before fading to invisibility (or until interacted with). The activated hotspot 1720 shows multiple annotations 1740, 1760 in an annotation display area 1730. One of the annotations 1740 is the text "you look great in that snorkel". The second annotation 1760 is a hyperlink. The hyperlink text is "Learn more about Snorkeling at Molokini near Maui, Hi.", and the hyperlink, when activated, is configured to bring the user to the Hawaii Tourism Authority website. Other potential hyperlinks for this example include a site providing historical background, professional photographs of the area, a travel site that focuses on travel to Maui, direct links to a content site, direct links to a Voice-over-IP connection to individual boat owners who bring people on snorkeling trips to Molokini, and the like.

Figure 18:
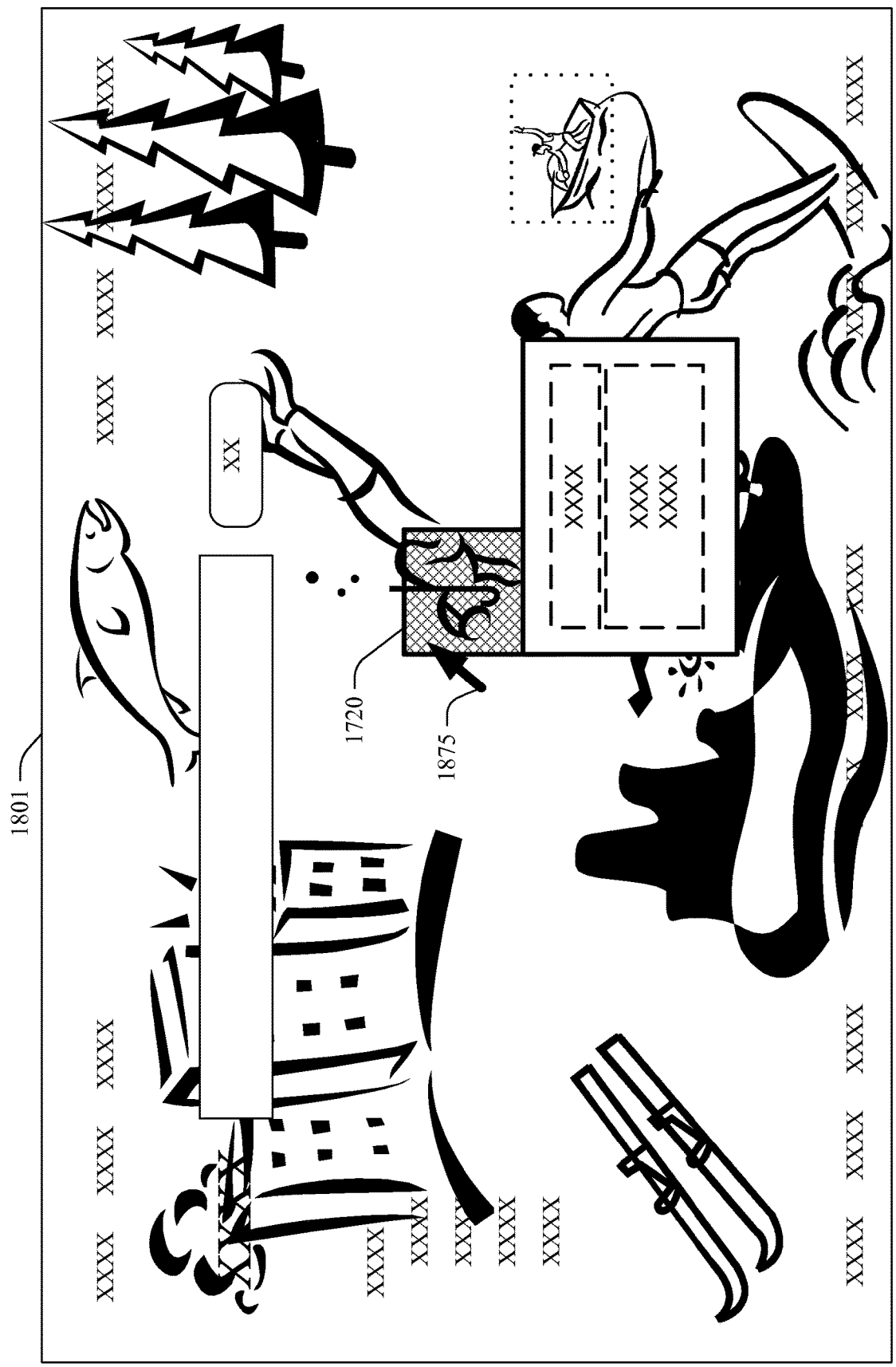
FIG. 18 illustrates the socially relevant collage of FIG. 17 displacing the background image of the home page of FIG. 8.

FIG. 18 illustrates a completion of this example. The socially relevant personalized collage 1601 displaces a default background image 700 (See also FIG. 8) in a home page 600, resulting in a home page with a socially relevant background image 1801. Therefore, in this example, the user received a home page 1801 with a collage of personally relevant photos, with two hotspots. The user may move a mouse pointer 1875 over the activated hotspot 1720, allowing the user to easily obtain additional information about Molokini, the ability to learn more about tourist activities in Maui, or otherwise exercise purchasing options related to the activities of their social network.

FIG. 1 illustrates an example generalized functional block diagram of an example system that provides personalized data based on social networking data. The system may include one or more social networking applications 120. A social networking application 120 includes any suitable online social network application where the social relations of participants in the social networking application 120 can be created and determined. The social relations associated with a social networking participant 190 are called the social networking participant 190's social networks 110. The social networks 110 may cause user generated content 115 to be provided to the social networking application 120.

A receiver component 130 may receive social networking data 125 from the social networking application 120. Based on the social networking data, a customization component 150 provides personalized social-based data. The personalized social-based data may include data not in the social networking data, but correlated through a semantic meaning of user generated content in the social networking data. For example, the customization component 150 may customize a web page, application resource, file, collage definition, collage, data structure, program execution, and the like to cause personalized social-based data to display on a computing device 160 used by the social networking participant 190. In one implementation, the computing device 160 includes a receiver component 130 and/or a customization component 150.

Figure 2:
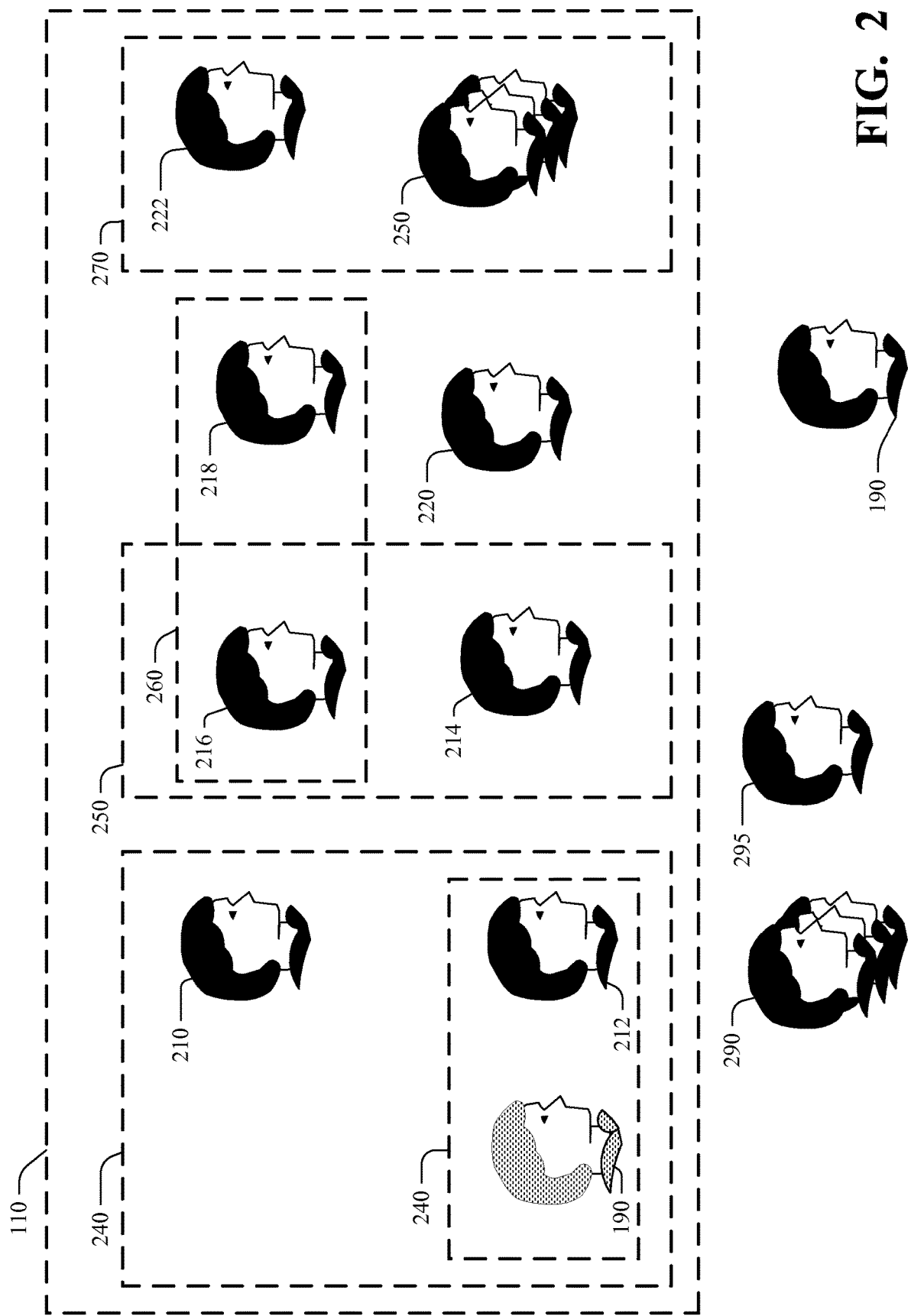
FIG. 2 illustrates an example generalized diagram of example social networks.

FIG. 2 illustrates an example generalized diagram of example social networks. In this example, social networks 110 are associated with the social networking participant 190. The social networks 110 associated with the social networking participant 190 may comprise individual social networking identities 210, 212, 214, 216, 218, 220, 222, social networks 240, 250, 260, 270, 280, or suitable combinations thereof. An individual social networking identity may be any legal person (e.g., a corporate entity) or natural person. A social network 260 may comprise multiple social networking identities 216, 218. A social network 280 may be a subset of a larger social network 240. The containing social network 270 may include the members 216, 214 of the contained social network 250 directly. The containing social network 270 may include the contained social network 250 by reference, for example to ensure the membership of the containing social network 270 is automatically updated with the membership of the contained 250 social network. A social network 260 may have membership 216, 218 which partially overlaps the membership 216, 214 of another social network 250. For each social network (e.g., 270), the social networking identities (e.g., 222, 216, 214) included in the corresponding network (e.g., 270) are considered to be a member of that social network (e.g., 270).

Some social networks 240, 245 may include the social networking participant 190, such as interest groups the social networking participant has joined. Thus, a social network 240, 245 may indicate that the social networking participant 190 is part of his own social networks 240, 245, 110. However, for the purposes of this application, the term social network will exclude the social networking participant 190 from their own social networks.

The social networking participant 190 may have named or otherwise defined a relationship to the social networks 110 or individuals within their social networks 110. For example, the relationship may be defined as family, friend, coworker, following (e.g., to express interest in updates from), or the like. The relationship may be a bi-directional relationship, requiring both social networking identities to confirm the relationship, or it may be unidirectional.

An expanded social network (not shown) may include more than one degree of separation (e.g., "friends of friends" is two degrees of separation), thus updating based on the social networks (not shown) of the social networking identities in the social networking participant's 190 social networks 110.

The social networking participant 190 may have also indicated an interest in a social networking identity 290, 295 not included in the social networks 110. As an example, the social networking participant 190 may have shown interest in the subject matter that is a focus of an individual social networking identity 295 or a social network 290 through activities outside the social networking application 120. An example social network 290 is an automobile club which focuses its attention on a specific brand of car. The showing of interest could include such things as search engine query logs, the history of web sites visited, purchasing history, interactions with advertisements, types and quantities of games played, and the like.

In one implementation, social networking data 125 comprises an indicium of at least one social network, one or more indicium corresponding to a plurality of user generated content, and an indicium of at least one relationship between at least two of the plurality of user generated content (e.g., comment 335 provided in response to comment 325, comment 325 uploaded by identity 214, etc.).

Figure 3:
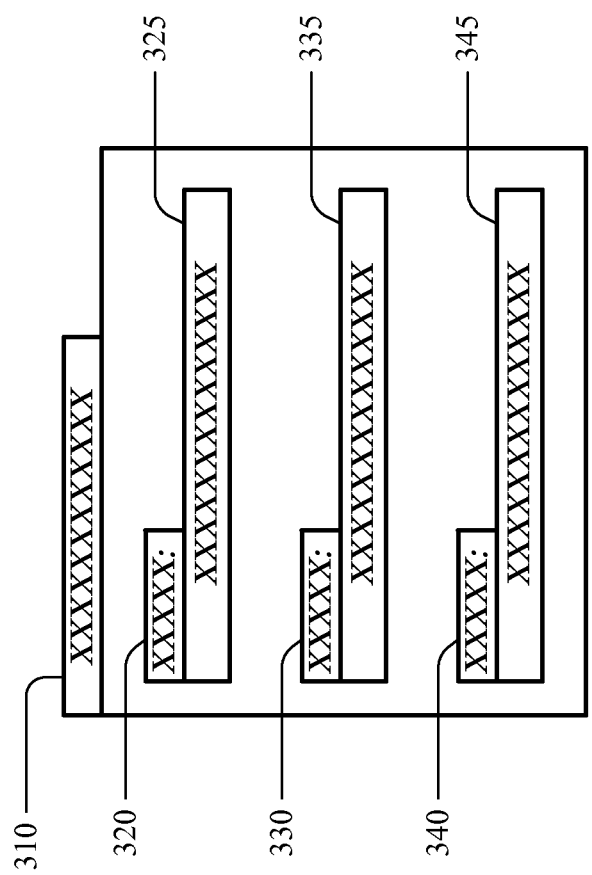
FIGS. 3-5 each illustrate a generalized example of user generated content.
Figure 4:
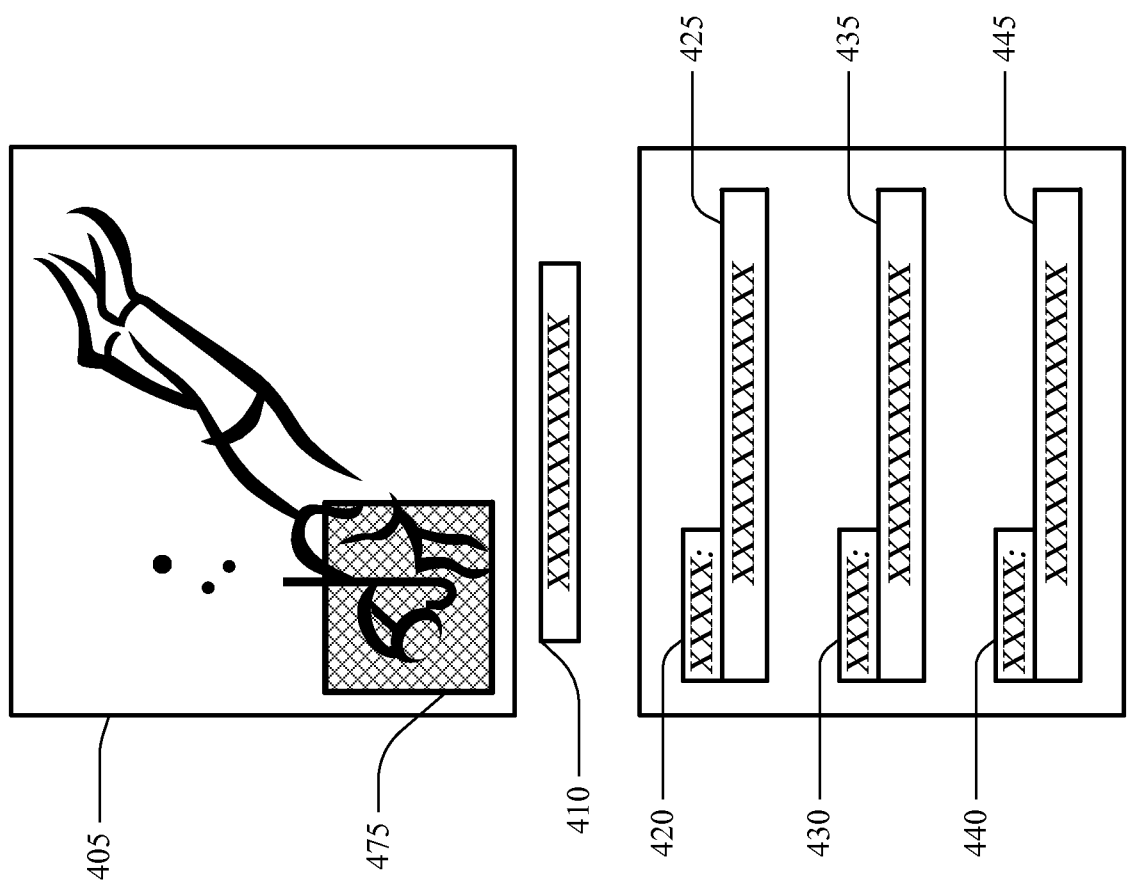
Figure 5:
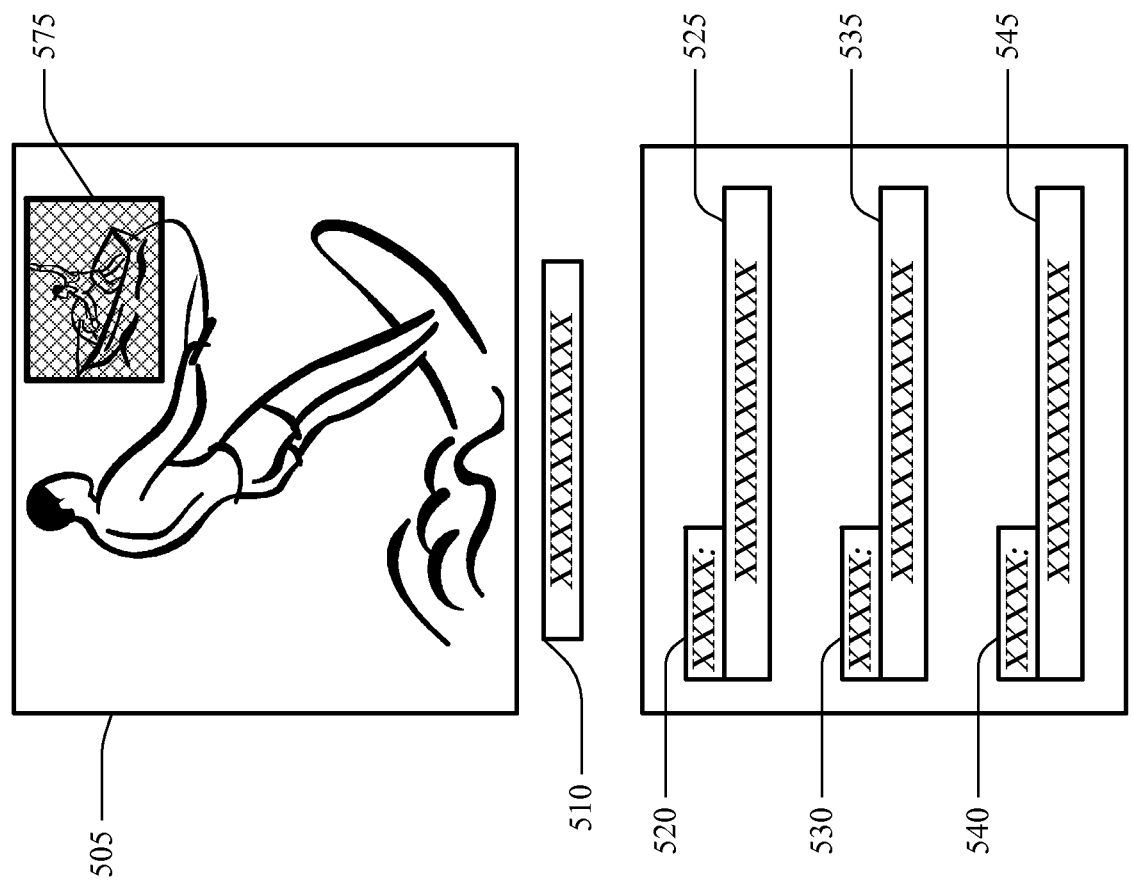

FIGS. 3-5 each illustrate a generalized example of user generated content 115. The social networking identity (not shown) that caused the user generated content 115 to be provided to the social networking application 120 is called the "uploader" of that user generated content. User generated content uploaded by the social networking participant 190 for whom the personalized social-based data is being provided will be referred to as "self-uploaded user generated content". When used without a prefix of "self-uploaded", the term user generated content 115 explicitly excludes self-uploaded user generated content. Operations, steps, or acts may be described which could be based on user generated content that includes self-uploaded user generated content. However, a person having ordinary skill in the art will appreciate that the inclusion of the self-uploaded content is not required. Therefore, any, all, or none of the operations, steps, and acts so described in this specification may occur while excluding the self-uploaded user generated content.

User generated content 115 may include a short message, a status update, a photograph or other image, a video, audio data, messages broadcast to "followers" of a social networking identity, the time the user generated content 115 was generated, updated, or provided to the social networking application 120, and the like.

User generated content 115 may also include metadata embedded in or associated with the user generated content 115. For example, a photograph may include multiple photograph metadata, such as the model of camera used, lens type(s) used, shutter speeds used, tags, positional or GPS data for photograph, directional (vector) data indicating the direction the camera was pointed, resolution, color depth (such as 32 bits per pixel), and pixel shape.

For additional illustration of generalized examples of user generated content, FIGS. 3-5 will now be described in turn.

FIG. 3 illustrates a generalized example of user generated content 115. In this example, a first social networking identity (e.g., 212, FIG. 2) may post a status update 310 to the social networking application 120. In this example the first social networking identity is the uploader of the status update 310.

The status update may be shared. The sharing may be with all users of the social networking application 120, only those users in the first social networking identity's social networks, specific social networking identities, or a subset of those users. The sharing may also include an indication of access permissions, such as read, add comments, delete comments, update metadata, full control, and the like, or combinations thereof. Typically, the first social networking identity is able to at least read the status update 310, and thus the status update 310 may be considered to be shared with the first social networking identity unless explicitly not shared with the first social networking identity.

The sharing may be explicit (e.g., listing the set of social networking identities who may access the data), or it may be implicit (e.g., always limited by default to a predetermined set of at least one social networking identity in the social networks of the social networking participant). Permissions criteria (alone or in combination) may be used for determining who may view the user generated content 115. Examples of permissions criteria include a viewer's geographic location, the degree of separation between a second participant (e.g., 214 or 190) and the viewer (e.g., "friends of friends" is two degrees of separation), and a minimum number of days since the social networking identity first started using the social networking application.

Any of the social networking identities with which the status update 310 is shared may then post comments 325, 335, and 345. As examples, the comments may be explicitly associated with the status update 310 or with a previous comment. In some instances, the comments may automatically include a tag 320, 330, 340 associated with the respective comment 325, 335, 345. The automatic tag may include an indication of the social networking identity making the comment, the date, the time of day, and similar data.

In social networking data 125 based on this example, any or all of the status update 310, the tags 320, 330, 340, the comments 325, 335, 345, and the uploader of each of these items may be associated with each other.

FIG. 4 illustrates a generalized example of user generated content 115. In this example, a first social networking identity may post a photograph (or other image) 405 to the social networking application 120. The photograph 405 may include a caption 410. The caption may be associated with the photograph 405 or with a portion of the photograph 475.

The photograph 405 may be shared with users of the social networking application 120. Any of the social networking identities with which the photograph 405 is shared may then post comments 425, 435, 445 (e.g., responsive to the first social network identity's post). The comments may be associated with the entire photograph 405, a portion of the photograph 475, or a previous comment. In some instances, the comments may automatically include a tag 420, 430, 440 associated with the respective comment 425, 435, 445. The automatic tag may include an indication of the social networking identity making the comment, a portion of the photograph 475 to which the comment applies, the date, the time of day, and similar data.

In social networking data 125 based on this example, any or all of the photograph 405, the caption 410, the tags 420, 430, 440, the comments 425, 435, 445, the portion of the photograph 475, and the uploader of each of these items may be associated with each other.

FIG. 5 illustrates a generalized example of user generated content 115. In this example, a first social networking identity may post a video (or other animation) 505 to the social networking application 120. The video 505 may include at least one caption 510. The caption 510 may be associated with a specific period of time of the video (not shown), or the caption 510 may be associated with the entirety of the video 505.

The video 505 may be shared with users of the social networking application 120. Any of the social networking identities with which the video 505 is shared may then post comments 525, 535, 545. The comments may be associated with any video portion. Examples of a video portion include the entire video 505, a specific period of time of the video (not shown), a selection box that follows an object in the video over time, or a single frame of the video. The comments may also be associated with one or more previous comments. In some instances, the comments may automatically include a tag 520, 530, 540 associated with the respective comment 525, 535, 545. The automatic tag may include an indication of the social networking identity making the comment, a portion of the video 575 to which the comment applies, the date, the time of day, and similar data.

In social networking data 125 based on this example, each of the comments 525, 535, 545 may be associated with any or all of each other, the caption 510, the video 505, the portion of the video 575, and the uploader of each of these items.

Returning to FIG. 1, a receiver component 130 may receive social networking data 125 from a social networking application 120. The social networking data 125 may include the social networking participant's 190 social networks 110, user generated content 115, and the relationships between these items.

The social networking application 120 may, responsive to the receiver component 130 providing a credential enable receiving the social networking data 125 associated with a social networking participant 190. Examples of credentials include authorization tokens, digital certificates, passphrases, and passwords. In another example, the social networking application 120 may provide scrambled or encrypted data to the receiver component 130. In one such example, the social networking application 120 may provide the appropriate descrambling or decryption ability to the receiver component 130 upon verification of the credential. In another such example, the descrambling or decryption of the data may be based on the credential without explicit authorization operations by the social networking application 120.

Social networking data 125 may be an aggregation of multiple social networking data. Social networking data 125 may be an aggregation of social networking data 125 from multiple social networking applications 120, or social networking data 125 from another application (not shown) which aggregates multiple non-empty sets of social data 125.

Figure 6:
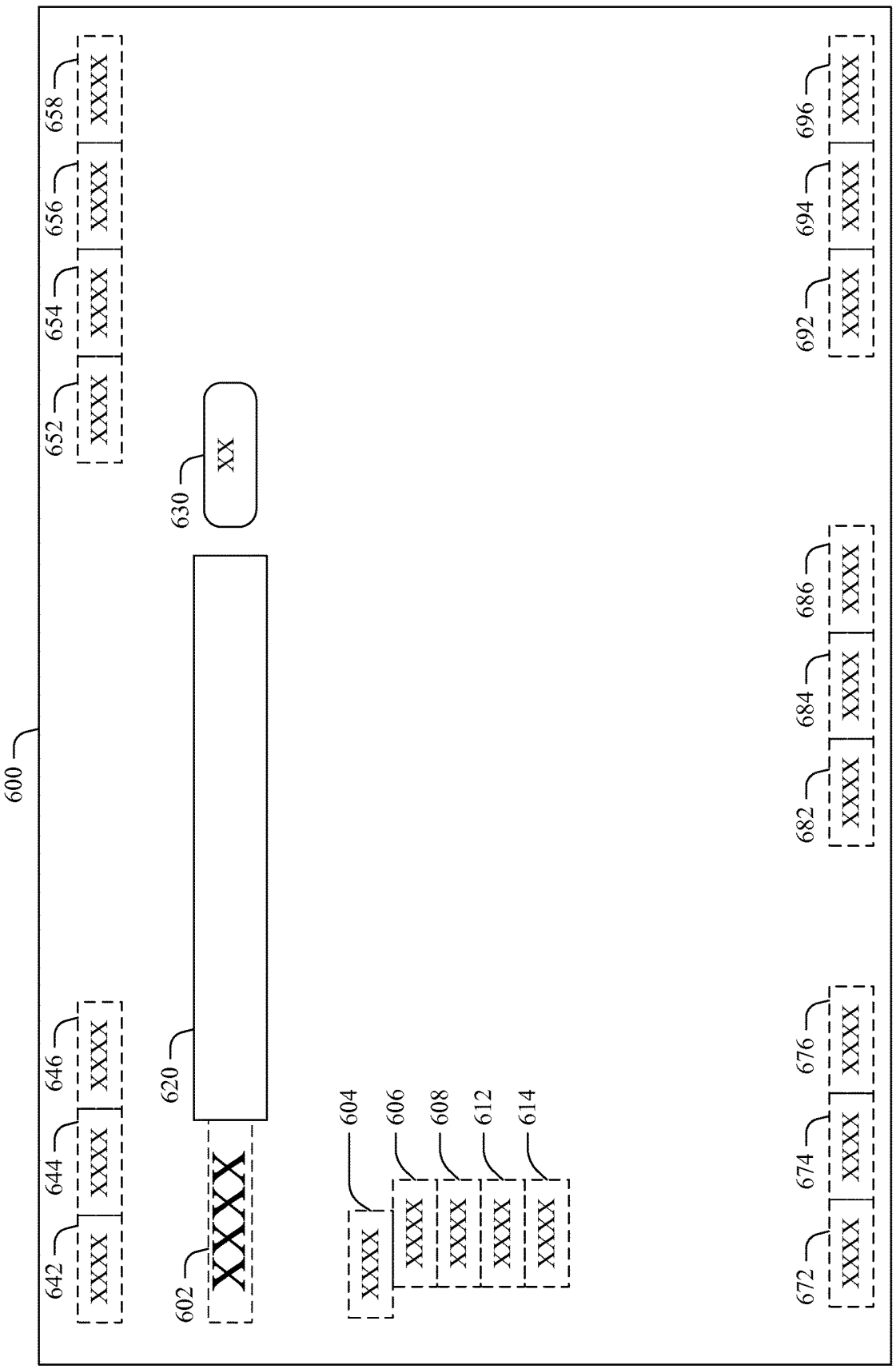
FIG. 6 illustrates a generalized example of a home page.

FIG. 6 illustrates a generalized example of a user interface, which may be any user interface (UI) displayed to, and interacted with by, the social networking participant 190. Examples of a user interface include a web browser default starting page, a search engine start page (e.g., what is seen by going to www.BING.com), a "home" screen on a mobile phone, and a launch screen for a game.

In this example, a web browser home page 600 is shown. The home page may comprise at least one user interaction element 620, 630, 682, 684, 686, such as a button, text entry box, drop-down menu, sliders, hyperlinks, radio buttons, multi-select lists, and the like. The home page may comprise one or more static elements 602, 604, 606, 608, 612, 614, 620, 630, 642, 644, 646, 652, 654, 656, 658, examples of which are discussed in detail below. The home page may also comprise one or more default elements 672, 674, 676, 682, 684, 686, 692, 694, 696, examples of which are discussed in detail below.

A default element may be displaced by personalized social-based data. The term "displace" means to use in place of another thing, whether that other thing is currently being used or not. Thus, both replacing an old image that is currently showing with a new image, and displaying the new image where the old image was going to be (but has not yet been) displayed, would both be properly described as "the new image displacing the old image".

The specific layout of FIG. 6 is intended only for illustrative purposes, and should not be construed as limiting the scope of home page layouts. Although various elements are shown using "XXXX" as placeholder text, any, all, or none of these elements may be of various forms. For example, they may be text that is multi-line, of varying length, varying font, and the like, or they may be image or video, or they may be an interactive element such as a hyperlink, button, or a popup.

The static element 602 may be a brand name of a search engine, such as BING. The static element 620 may be a text entry box, and may be used to provide a search query string to the search engine. The static element 630 may be a button, and may be used to submit a query to the search engine. The static elements 604, 606, 608, 612, and 614 may be categories or methods of searching.

Any or all of the static elements 642, 644, 646, 652, 654, 656, 658 may be hyperlinks to related programs and services, such as a link to tour the capabilities of the present site, a link to a news site such as MSNBC, an online e-mail service such as HOTMAIL, a link to make the home page the default homepage, a link to authenticate the viewer's identity, a link to optimize the home page for a specific geographic region of the world, and a link to set preferences.

Any or all of the default elements 672, 674, 676, 682, 684, 686, 692, 694, 696 may be a default annotation on the page. The default elements may be any data shown to viewers of the home page by default. As examples, default element may include audio, video, text, a hyperlink, or a photograph. The default elements may be data of general interest (such as holidays, daylight savings time switches, and storm/weather warnings for a geographic area). The default elements may comprise a search term that is currently popular within a geographic area (such as the United States).

Figure 7:
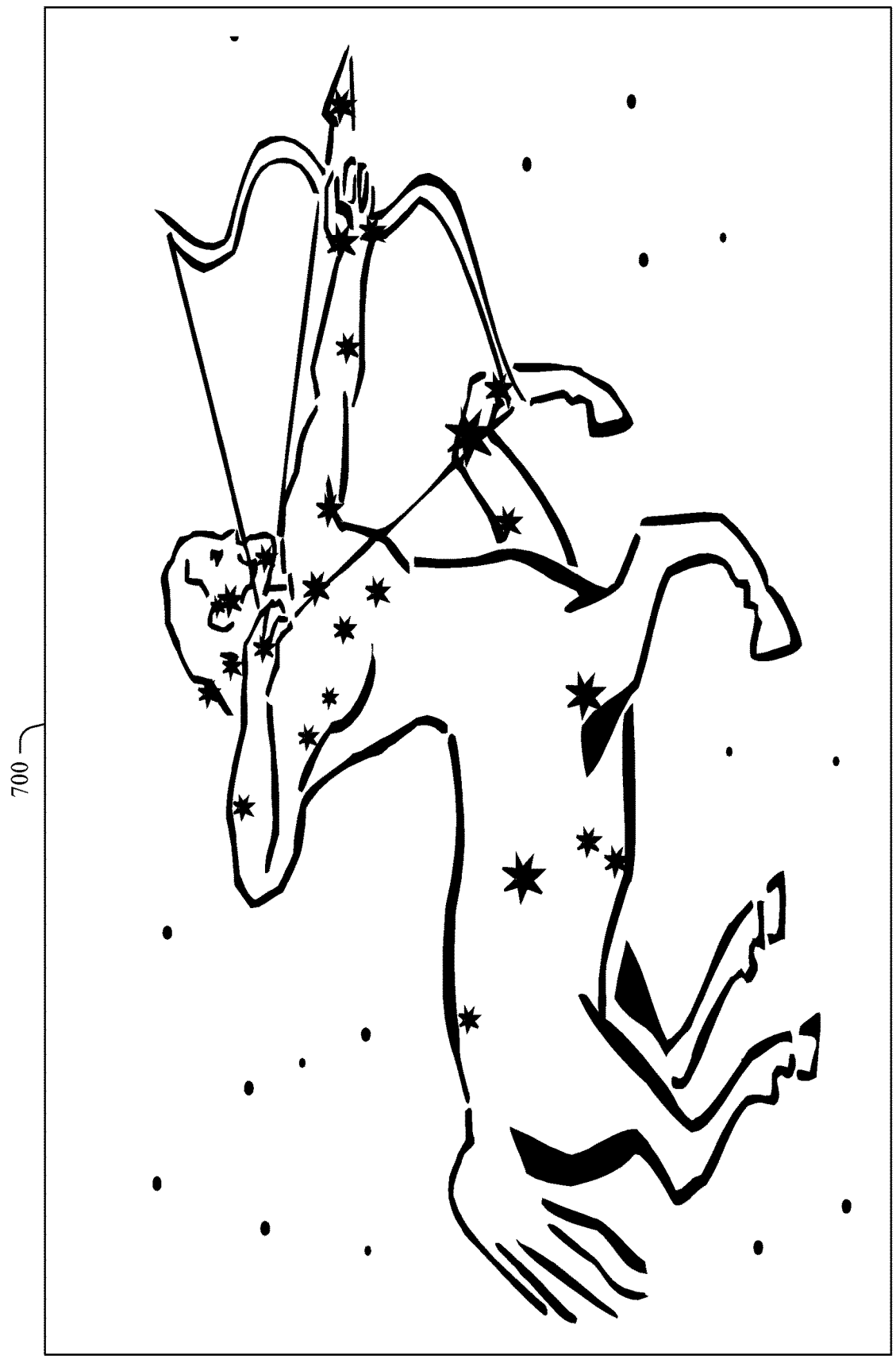
FIG. 7 illustrates an example background image default element.

FIG. 7 illustrates an example default element for the example home page of FIG. 6. In this example, an image of a constellation 700 is shown.

Figure 8:
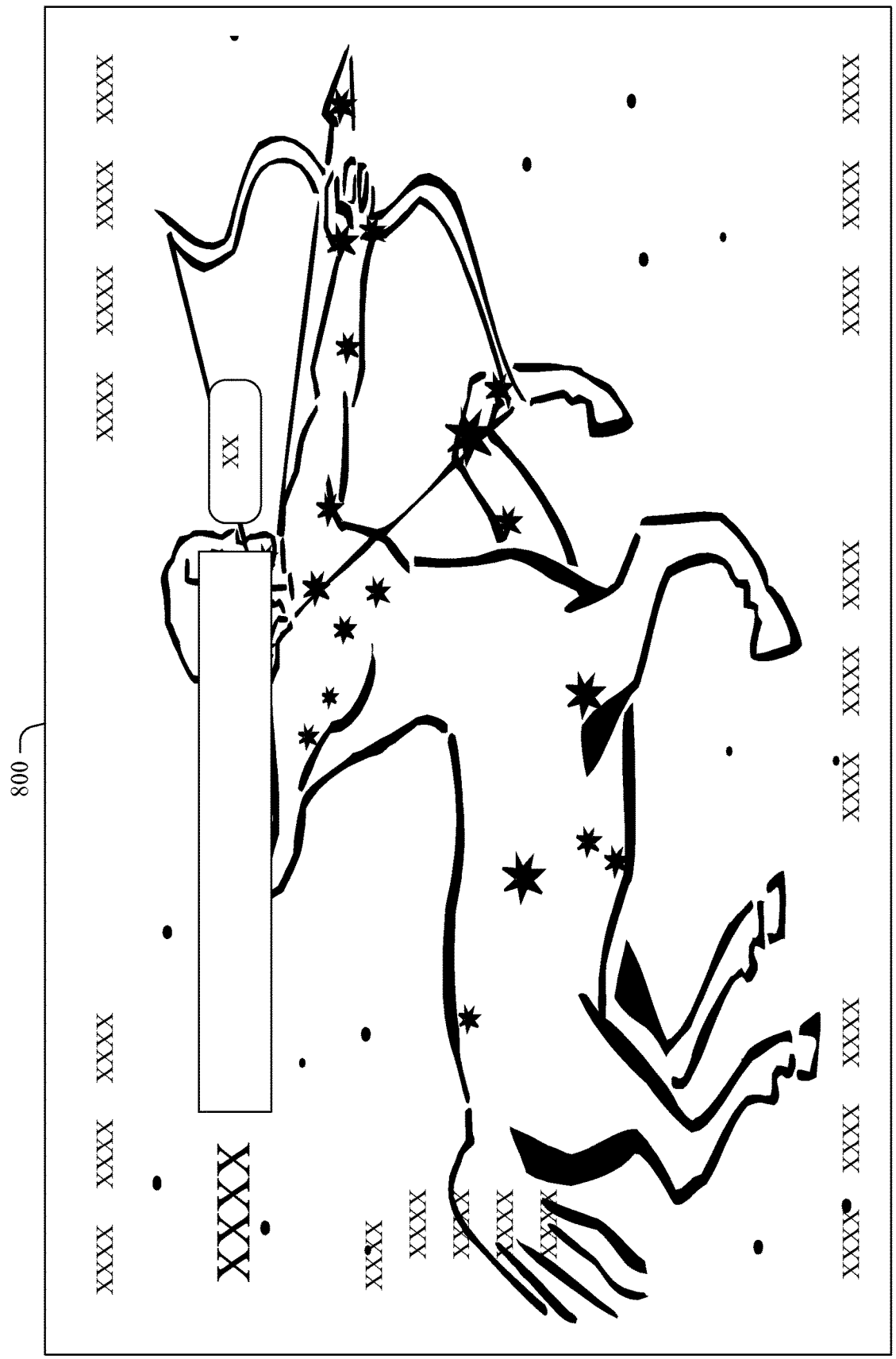
FIG. 8 illustrates the home page of FIG. 6 with the background image of FIG. 7.

FIG. 8 illustrates the home page of FIG. 6 with the default background element of FIG. 7. In this example, the image of a constellation 700 is used as a background for at least a portion of the home page.

Figure 9:
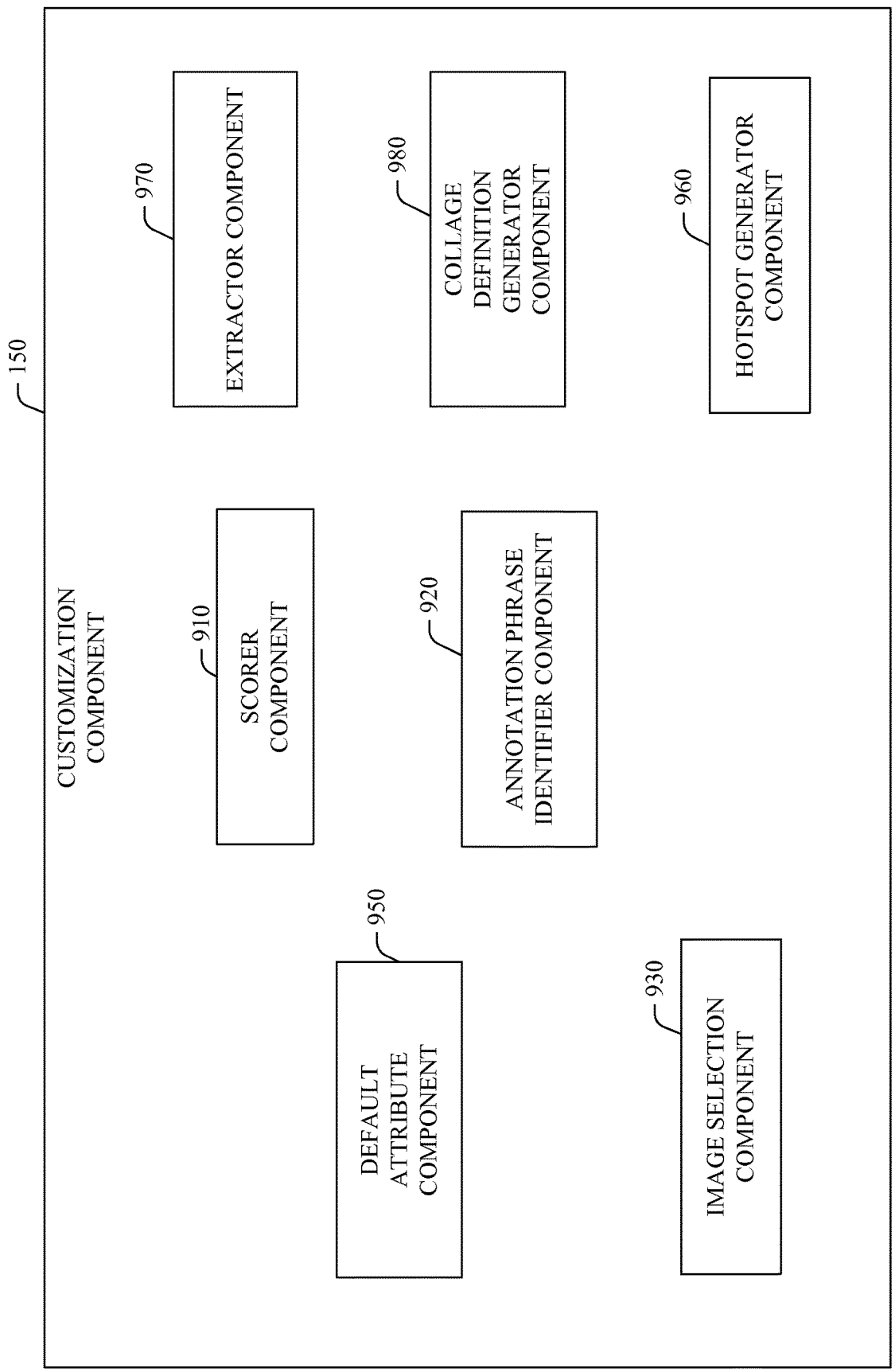
FIG. 9 illustrates a generalized example functional block diagram of a customization component.

FIG. 9 illustrates a generalized example functional block diagram of an example customization component 150. The customization component 150 may generate (e.g., compute, create, arrange, configure, mix, and/or result in) a personalized social-based data 155. Personalized social-based data is data that is socially relevant to a particular social networking identity. The customization component may include any or all of an extractor component 970, a scorer component 910, an annotation phrase identifier component 920, an image selection component 930, a default attribute component 950, and a hotspot generator component 960.

The extractor component 970 analyzes the contents of the social networking data 125 to extract at least one entity. The extracted entity is semantically related to at least a portion of the user generated content 115 in the social networking data.

An entity may be a semantic or canonical meaning associated with one or more of the user generated content 115. The extractor component 970 may be any system that recognizes and maps the user generated content 115 to an entity, such as a natural language processing system.

The extractor component 970 may, as part of the analysis of the user generated content 115, base the analysis on social networking data other than the user generated content. As an example of this, the analysis may consider multiple comments on a single photograph as interrelated, and attempt to find an online reference article containing words related to the one or more entities from those comments.

The extractor component 970 may include an algorithm that is capable of assessing a semantic interpretation of the user generated content 115. To assess a semantic interpretation of the user generated content 115, a matching algorithm may segment text social networking data into multiple terms and determines the relationship between the multiple terms.

The extractor component 970 may determine a resulting entity based on one or more text data within the social networking data 125. In one implementation, the text data may be based on captions, comments, or folder names associated with user generated content.

In one implementation, the extractor component 970 may take one or more text data within the social networking data 125 corresponding to a user generated content, and identify one or more surface forms from the text data. A surface form is a one or more words that are used in text to mention an entity. The extractor component 970 may identify one or more surface forms based on a surface identification parameter. The extractor component 970 may associate one or more surface forms with a particular entity. The surface forms may be ranked based on a score, such as one from a scorer component 910, based on a surface identification parameter. The association between a one or more surface forms and a particular entity may be ranked based on a score, such as one from a scorer component 910, based on an entity extraction metric.

Examples of surface identification parameters include word separators (e.g. spaces, tabs, periods, dashes) to find individual words, punctuation (e.g. commas, periods, colons) to assist finding individual or multiple word surface forms, and connector phrases (e.g. "of", "in") to assist finding multiple word surface forms. In one example, the phrase "it was due to a storm in seattle" would have surface forms of "storm", "Seattle", and "storm in Seattle".

In one example, the surface identification parameters include a capitalization hint (e.g. all capital, all lowercase, First Letter Capitalized, First word in a sentence plus an occasional name such as Seattle, used only for EMPHASIS) based on the text data. For example, if the capitalization hint indicates the capitalization of the text data is more likely to be reliable, the capitalization used in the text data is maintained in the surface form. In one implementation, the surface form is always lowercase, and a reference to the original capitalization of the surface form and the capitalization hint is retained.

The extractor component 970 may associate one or more surface forms with an entity based on a scoring by the scorer component 910. In one example, the entity extraction metrics include a score based on a surface identification metric.

In one example, the entity extraction metrics include correlations between one or more of the surface forms and a database and/or online knowledge repository (e.g., a large encyclopedic collection and web search results). In one example, the entity extraction metrics include the frequency in which the surface form was found in the one or more text data. In one example, the entity extraction metrics include the frequency in which the surface form was found in the database and/or online knowledge repository.

In one example, the entity extraction metrics include a capitalization hint based on the text data the surface form was identified from. For example, if the capitalization hint indicates the capitalization of the surface form is more likely to be reliable, capitalization of one or more words in the surface form may result in a preferential score (and thus higher likelihood of selection). In one example, the capitalization hint indicates the capitalization is not reliable, and thus the capitalization may be ignored, auto-corrected, or the surface forms may be considered in multiple alternate forms (e.g. "blue sky", "Blue Sky", and "BLUE SKY". As an example, when parsing closed-captioning text data from a video, the text data may be entirely in capital letters, and thus treated as not having reliable capitalization.

In one implementation, a surface identification parameter may include a spelling correction hint. If a surface form is determined to be a possible misspelling, both the surface form and one or more of the corrected spellings may be identified as surface forms. For example, a surface form of "Ipert" may be analyzed as "Ipert", "pert", and "part"". In one example, each of these three spellings may be given a "mutual exclusion" status, so only one may be chosen as an entity. In one example, each of these three spellings may result in applying a different entity scoring parameter scoring based on the likelihood of the misspelling.

In some cases, however, without context a message may be difficult to comprehend by the extractor component. In one implementation, an entity extraction metric may include a social relationship between a first text data and a second text data. For example, the extractor component 970 may determine a resulting entity based on the social relationships between one more text data uploaded by a first social networking identity within the social networking data 125 and a second one or more text data uploaded by a second social networking identity within the other social networking data 125. In one implementation, the analysis may prefer correlations between a first user generated content uploaded by a member of a social network (such as the network named "family" or "hometown") and a second user generated content uploaded by a member of that same social network.

The extractor component 970 may determine a resulting entity based on the relationship between the social networking participant 190 and the social networking identity which generated a social networking data 125. In one implementation, although the individual comments taken alone may result in an incorrect entity, grouping the comments based on the social data enables an accurate entity to be extracted. In one example, the grouping may be of multiple comments from different photographs in a photo album. In a second example the grouping may be of multiple photographs based on a celebration day (e.g., a holiday). In a third example, a combination of these groupings may be combined as an intersection, union, or exclusion (e.g., photographs taken on or near a social networking identity's birthday, and only including pictures from immediate family members in the analysis, but not including photos from a particular social networking identity).

In one implementation, the extractor component 970 may be based on a large-scale system for the recognition and disambiguation of named entities based on information extracted from a large encyclopedic collection and web search results, including algorithms as described in *Large-Scale Named Entity Disambiguation Based on Wikipedia Data* by S. Cucerzan, Proceedings of EMNLP-CoNLL 2007, pages 708 716.

Similarly, the extractor component 970 may perform analysis by using image analysis on photos, video analysis on videos, or audio analysis on audio. The extractor component 970 may score multiple potential entity results using a scorer component 910. The extractor component 970 may combine multiple methods of analysis to determine a resulting entity. In one implementation, the extractor component 970 generates multiple possible entities, for example any entity with a score over a predetermined threshold.

In one implementation, a picture with a caption of "seattle storm" may first be broken into the terms "seattle" and "storm". A relationship between "seattle" and "storm" may then be determined based on the social networking data 125, profile data the extractor component 970 may have about the social networking participant 190, the one or more social networks 110, the relationship of the potential entity results to the user generated content 115, an online knowledge collection such as WIKIPEDIA, a local cache of at least portions of an online knowledge collection such as WIKIPEDIA, or other external data sources (i.e. not from a social networking application).

To further illustrate, if the user's social networks 110 included multiple fans of professional women's basketball teams, this may indicate the social networking participant 190 has an interest in the WNBA. The scorer component 910 may then provide a score favoring the entity corresponding to the SEATTLE STORM professional women's basketball team because of the presence of (or based on the number of) such fans. The extractor component 970 may further that a severe meteorological storm (STORM LINDA) may have hit the Seattle area at a relevant time, such as by correlating the meteorological storm with a time close to the picture being taken or posted, or if other comments on the picture include the text "lots of trees fell". The scorer component 970 may then provide a score favoring the entity corresponding to that particular meteorological storm based on those comments having at least one possible contextual meaning that corresponds to a meteorological storm. Then, based on the SEATTLE STORM named entity score and the STORM LINDA named entity score, the extractor component may choose the named entity with the more favorable score.

In one implementation, the text data in the user generated content 125 associated with the social networking data 125 may be restricted to short text messages (e.g., no more than 160, 140, 70, or 40 characters). In one scenario, a given plurality of short messages would, if analyzed individually, map to an unrelated entity, or not map reliably to any entity. However, when combined with the analysis of the related social networking data 125, the extractor component 970 may be able to determine that the given plurality of short text messages are related to each other based on the corresponding plurality of social networking identities associated with the messages. Applying this relationship between multiple messages, an entity may be extracted that is closely related to the multiple short text messages.

The extractor component 970 may result in a named entity (e.g., an entity corresponding to names or locations). The extractor component may perform semantic disambiguation to result in either a disambiguated entity (e.g., "can" with the meaning of a cylindrical storage container), or a disambiguated named entity (e.g., people names or locations). In analyzing an entity corresponding to a piece of user generated content 115, the semantic disambiguation may use the social networking data 125 to find additional user generated content 115 related to the entity. The semantic disambiguation may change a decision between at least two possibilities based on the additional user generated content 115 that is also related to the entity. Thus, the semantic disambiguation based on the social relationships may improve the accuracy and reliability of the semantic disambiguation.

In one implementation, the extractor component 970 thus extracts at least one entity correlating to a user generated content 115 in the social networking data 125 with both a high degree of accuracy and high social relevance to the social networking participant 190.

The criteria the customization component 150 may use to score annotation phrases, images, and entities (collectively, scorable items) may be based on any suitable scoring parameter. Examples of such suitable scoring parameters may include the closeness of a match between the entity's canonical meaning and the canonical meaning associated with other of the one or more entities, an interestingness metric of the scorable item, the closeness of a match between a first of the one or more scorable item's text data and the number of similar text data associated with other of the one or more scorable items (e.g., to encourage or discourage the selection of multiple entities with related meanings), the closeness of a match between the scorable item and associated social networking data (e.g., the name of the folder containing a picture, where the picture is associated with the entity), how recently a corresponding scorable item was last updated or created (e.g., recently uploaded photographs, recently changed comments), a relationship between the social networking participant 190 and the uploader of the corresponding user generated content 115, the number of comments on the user generated content 115, user-generated content ratings, explicit settings by the social networking participant 190's to see or avoid certain people, social networking identities, or social networks 110, a property or type of the scorable item being scored (e.g., picture, video, contrast, time, size), and an indicium of social networking participant 190's preference.

These scoring factors may include whether the scorable item was previously viewed by the individual, the relationship between the individual and the scorable item, and/or an indicium of interest in the scorable item by the social networking participant 190.

In one example, the scorer component 910 determines that the social networking participant 190 recently purchased a home. The scorer component 910 then gives preference when scoring a scorable item related to new homes for the personalized home page. In one example, this is done by modification of a scoring parameter (e.g., configured to give a preferential score to scorable items corresponding to new homes). For example, this preference may cause a cluster of entities related to furniture, drapes, paint, local grocery stores, neighborhood schools, or other entities likely to be of interest to a new home buyer to have higher score (and thus be more likely to be selected), while still ensuring the entities are socially relevant.

In one example, the scorer component 910 determines that the social networking participant 190 is throwing a celebration for a friend soon. The scorer component 910 then gives preference when scoring entities related to party decorations, cake, candles, balloons, and other celebration related entities. In this example, the scores from the scorer component 910 may generate preferential values for user generated content 115 related to recent events in the social networking participant 190's life, work, or home.

In one example, the scorer component 910 determines that the social networking participant 190 has previously activated hotspots corresponding to the action category "travel". In this example, the scorer component 910 then gives preference to entities related to tourism locations, airports, vacation trips, and.

In one example, the scorer component 910 determines that the social networking participant 190 has previously interacted with a specific action category or action text (e.g., "clicked through" an action category or action text, each described in more detail below). The scorer component 910 then gives preference to the action category or action text which resulted in user interaction (such as a click through).

An annotation phrase identifier component 920 identifies possible phrases of interest to the social networking participant 190. The annotation phrase extraction may be based on an extracted entity. The possible annotations may be ranked based on a score, such as one from a scorer component 910, based on an annotation phrase parameter. Example annotation phrase parameters include whether the phrases occurred in a status update 310, a caption 410, 510, a comment 325, 335, 345, 425, 435, 445, 525, 535, 545, whether the phrase corresponds to an entire video 505 or photograph 405, whether the phrase corresponds to a portion of a video 575 or photograph 475, and the frequency of words in the possible phrase in comments corresponding to the same or related user generated content 115.

A personalized phrase extracted by the annotation phrase extractor component may have a social interestingness metric. In one example where the extracted phrase is less socially interesting, the phrase may be based only indirectly on user generated content 115 associated with an extracted entity. In this example, the extracted annotation phrase may be extracted from an online encyclopedia entry corresponding to the entity (e.g., an entry for Snoqualmie Falls in an online knowledge collection such as WIKIPEDIA), an official web site run by a disambiguated named entity (e.g., an official site for the Molokini Marine Life Conservation District), a manufacturer of a product corresponding to an entity (e.g., FABRIKAM shoes), or other data sources other than the user-generated content 115. In another example, where the personalized extracted phrase is more socially interesting, the entity may have been based on a photograph 405, and the extracted annotation phrase may be all or a portion of a comment 435 on the photograph 405, the extracted annotation phrase having been selected based upon the comment 435 pertaining to the photograph 405.

Therefore, in one implementation, the annotation phrase identifier component 920 extracts a personalized, socially relevant phrase from the user generated content 115.

A default element attribute component 950 may provide information (e.g., relating to one or more attributes or the preferred output of the customization component 150). In one implementation, the information corresponds to properties of a default element which the customization component 150 will be displacing with personalized, social-based data.

Examples of default element attributes include the preferred type of the personalized, social-based data (e.g., text, audio, video, etc.), preferred width, height, and/or length (e.g., number of pixels, number of characters, or number of seconds), an exclusion mask 1001 corresponding to areas that should not be used for user interaction (See FIG. 10 and FIG. 11), preferred overall style, theme, or dominant color(s), and preferred volume.

An image selector component 930 selects at least a portion of one or more photographs, videos, or other multimedia file. Although generally described in terms of photographs, videos may generally have the same image selection applied as photographs. The photograph may correspond to an entity, named entity, disambiguated entity, or disambiguated named entity, either from the user generated content, an online data source, or a local cache of images for popular entities. In one implementation, the photographs include user generated content 115 corresponding to an extracted entity.

The image selector component 930 may base its selection on a scoring by the scorer component 910. The scorer component 910 may score the available images based on a social interestingness metric about the photograph. Examples of social interestingness metrics include how recent the photograph 405 is, who posted the photograph 405 (e.g., the relationship of the social networking participant 190 to the photograph 405 uploader), whether the photograph 405 includes a human face (e.g., using automatic face detection), whether the photograph 405 includes an areas of relevance manually selected by at least one social networking identity in the social networks 110 (e.g., a comment on a particular area of a photograph), how long it has been since a photograph 405 (taken by or about the uploader), has been selected by the customization component 150, the number of comments 425, 435, 445 on the photograph 405, user rankings on the photograph 405, and the social networking participant's desire (or lack thereof) to see photographs of certain people, certain social networking identities 210, 212, 214, 216, 218, 220, 222, 295, or certain social networks 240, 250, 260, 270, 280. For example, the social networking participant may indicate they only want to see photos from the social network(s) named "collage photos", "family", and "work friends".

The image selector component 930 may base its selection on information from a default attribute component 950. For example, if selecting a single image, the image selection component 930 may prefer an image with sufficient resolution to scale to a default height and width attributes as provided by the default attribute component; if creating a photomontage, the images may be selected to result in a visually (as well as socially) appealing collage.

A hotspot generator component 960 generates hotspot definitions for the customization. A hotspot definition may be used to render the hotspot on a display device. A hotspot is an area of the display which responds to user interaction by showing one or more social-based annotations.

A hotspot definition may have numerous associated hotspot parameters. The hotspot parameters may include one or more annotations. Each annotation may be based on an annotation extracted by the annotation phrase extractor component, based on an entity extracted by the extractor component, and/or based on an image selected by the image selection component. In one implementation, a hotspot may include a first annotation phrase from the user generated content 115 and a second annotation phrase from an external data source corresponding to an extracted entity associated with the user generated content. An annotation may include hyperlinks, text, audio, video, or other data. In one implementation, the hotspot annotations may each be based on a single entity.

The hotspot parameters may include an entity parameter. The entity parameter may indicate an entity corresponding to the hotspot. In one implementation, this allows the hotspot definition to later be applied to an arbitrary location associated with the entity. For example, hotspot definitions may be generated before a photomontage is generated. In that example, the hotspot definition may be applied to the photomontage after the hotspot definition was generated, by determining where in the rendered photomontage the hotspot's entity is displayed.

The hotspot parameters may include an action parameter. The action parameter may include an action category which is appropriate for the hotspot. In one example, the action category is based on a category associated with the extracted entity. Examples of action categories include "type of product" (e.g., for an entity of "snorkel"), "tourist location" (e.g., for an entity of "Molokini"), "home improvements" (e.g., for an entity of "furniture"), and "sports team" (e.g., for an entity of "SEATTLE STORM").

An action parameter may include an action text which is appropriate for the hotspot. In one example, the action text is based on the extracted entity associated with the hotspot. In one example, the action text is based on an annotation phrase associated with the hotspot. The action text may indicate the type of action which will occur upon an interaction with the hotspot. The action text may indicate a purchasing action (e.g., "buy a . . . "), a social discovery action (e.g., "friends who use . . . "), and/or a public discovery action (e.g., "satellite photos of . . . ").

In one implementation, the action text is based on an action category associated with the extracted entity. In one example, an action category of "type of product" may have an action text of "learn more about", "shop for", "photos of friends with", or "special deals on". In one example, an action category of "tourist location" may have an action text of "learn more about", "travel to", or "videos of friends near". In one example, an action category of "sports team" may have an action text of "recent trades by", "stats for", or "purchase game tickets for".

In one implementation, the rendering of the hotspot may be based on the action parameter. In one example, an annotation is rendered based an action text, an extracted entity, an annotation phrase, an entity. In one implementation, when the user interacts with an annotation having an action parameter with an action text (e.g., hovering a mouse pointer over the annotation), the action text may be displayed to the user in combination with text based on the entity.

In one implementation, a replacement element may be based on the action parameter. For example, the hotspot may relate to replacement for a first default element (e.g., background picture), and a replacement for a second default element may be based on an action text or action category. In one example, replacing a default background element 700 may result in a hotspot 1720, with hotspot parameters including an entity parameter of "snorkel", an action parameter including an action category of "product" and an action text of "special deals on CONTOSO snorkels", and (when rendered) result in a default element 682 being replaced with a replacement element 1540 configured to render the action text.

The hotspot parameters may include a positional parameter. The positional parameter may determine the location to display the hotspot. In one implementation, a hotspot positional parameter is based on a predetermined location of an entity, for example to annotate an existing image or collage. The positional parameter may be a predetermined value, such as one provided by the default element attribute component. The positional parameter may be configured based on an exclusion mask 1001 (See FIG. 10), for example to ensure the resulting hotspot does not overlap the exclusion mask 1001. The positional parameter for a hotspot may include a centerpoint of the hotspot, a shape of the hotspot, or a corner of the hotspot. The positional parameters may be absolute positional parameters (e.g., x-y coordinates on screen), or relative to another location (e.g., upper left of replacement element, lower left of rendered entity, center of rendered multimedia file, etc.). There may be multiple positional parameters for the hotspot. There may be one or more positional parameters for any other rendered parameter (e.g., an annotation).

The hotspot parameters may include a visibility parameter. The hotspot visibility parameter may be configured to vary based on interaction with the hotspot, interaction with an area close to the hotspot, the velocity of a user input (e.g., a mouse, pen, eye tracking, etc.) showing movement towards or away from the hotspot, and/or combinations thereof. For example, the hotspot definition may configure the hotspot to fade smoothly into view (e.g., using alpha blending) as the user input moves toward the hotspot (e.g., between 30 and 9 pixels), and to fade out of view as the user input moves away from the hotspot (e.g., between 11 and 40 pixels). A hotspot which is not normally visible without user interaction is a hidden hotspot.

A hotspot may be active (responsive to user interaction) or inactive. Examples of hotspot parameters include an active timeframe parameter, and an inactive timeframe parameter. The hotspot definition may configure the hotspot to only be active at specific times, for example when a specific video or portion of a video is displayed. In one implementation, a hotspot is not visible while it is inactive.

The hotspot generator component 960 may generate multiple hotspot definitions with knowledge of existing hotspot definitions, for example to ensure the hotspots do not overlap or otherwise interfere with each other in a collage. In one example, previously generated hotspots are considered when generating a next hotspot. In another example, all hotspots are generated at once.

In one implementation, the hotspots contain annotations with personalized social-based hyperlinks for one or more selected photographs in a collage definition. In this case, the hotspot generator component may automatically associate the annotations to the one or more selected photographs (e.g., configure a display parameter to show the annotation at or near the section of the photograph corresponding to the annotation).

Thus, in one implementation, a context-sensitive collage may be configured to display an annotation when the user interacts with an area of the collage. When the user interacts with that area, they are provided a context-sensitive interactive collage that leads them to information related to their social network.

The collage generator component 980 determines how to combine a plurality of multimedia files, such as those selected by the image selector component 930, into a collage definition. Audio files, video files, and photographs are each examples of multimedia files. Multimedia files, when displayed, include non-text data, such as audio, video, touch, taste, smells, or other stimuli. The collage definition may then be rendered to display a collage by any appropriate means.

In one implementation, the collage definition is an image file (e.g., a .GIF, .JPG, .TIFF, or .PNG) generated by the customization component to displace a default image. In one implementation, the collage definition is an interpreted data structure, such as a SILVERLIGHT program, stored on computer-readable storage media.

Although commonly described in terms of a photomontage herein, a collage definition is not limited to static content. For example, an area of a collage rendered from a collage definition may display a video file, animated GIF, or the like. The collage definition may also include an audio component, tactile component, and/or olfactory component. Examples of audio components include audio as a part of a video segment, audio rendering with a visual display of the audio (e.g., waveform, visualizations, etc.), and audio rendered as sound.

In one implementation, a non-static content (e.g., videos, audio) may be configured to render using a static placeholder image based on the non-static content. In this implementation, the static placeholder image may be displaced by the non-static content upon a user interaction (e.g., interacting with the static placeholder image or a corresponding hotspot).

In one embodiment, the collage generator component 980 may be configured to create a collage definition for an appealing collage. Creating an appealing collage may involve combining photographs in a manner that takes into consideration social collage parameters, visual collage parameters, and collage rendering parameters (collectively, collage parameters). As an example, each collage parameter may relate to the entire rendered collage, to an area of the rendered collage, to one or more multimedia files referred to by the resulting the collage definition, or to one or more portions of one or more multimedia files referred to by the resulting collage definition.

Examples of social collage parameters include whether the photograph 405 is of scenery, whether the photograph 405 has people or faces corresponding to members of at least one of the social networks 110 of the social networking participant 190, a count of the number of people or faces corresponding to members of at least one of the social networks 110 of the social networking participant 190 in a photograph 405, the social network(s) associated with the photograph 405 and related data (e.g., 410, 420, 425, 430) (e.g., comments on the photograph 405), a rank or score associated with a social network (e.g., 250) or social networking identity (e.g., 220), and correlations between multiple potentially selected photographs (e.g., to select a group of photographs that ensure at least one photograph is from each of a plurality of social networks). In one implementation, one or more of these parameters may be based on only the portion of the photograph being considered for inclusion into the rendered collage.

Examples of visual collage parameters include whether the photograph is of scenery, whether the photograph displays faces, dominant colors, color balance, contrast, position information (e.g., configuring the collage to have multiple photographs overlap), height or width of the photograph (e.g., pixels or relative aspect ratio such as 4:3), length (in units of time) of a video segment, an indication of the multimedia file, image segmentation data (e.g., to ensure an object can fit within an areas of the rendered collage, or to avoid truncating an object in a photograph), using automated object selection, using graph-cuts, and using Poisson blending of alpha masks. In one implementation, the visual collage parameters are chosen to favor (or match) a brand identity (e.g., of a user interface, such as a home page, to which the personalized social-based customization is applied). In one implementation, the visual parameters are be chosen to favor (or match) properties of the default elements of the user interface.

A collage definition may include one or more collage rendering parameters. A collage rendering parameter is used to render the collage. Examples of collage rendering parameters include resizing parameters (e.g., height scaling factor, width scaling factor, time scaling factor), images, using image blending for smooth image transition at the edges between photographs (e.g., partially transparent overlapping edges), adjusting the visual properties of a photograph (e.g., causing selected images to have similar overall color balances), using non-regular shapes (e.g., blobs as opposed to rectangles, circles, triangles, trapezoids, and the like), using saliency filters, and adjusting the scaling of the image to avoid scaling artifacts (image degradation due to scaling).

In one implementation, the collage generator component 980 may include all or portions of the AUTOCOLLAGE automatic collage generation software product from MICROSOFT. See http://research.microsoft.com/en-us/um/cambridge/projects/autocollage/.

Additional examples of collage parameters include an indication of a photograph (or portions thereof), a location of a photograph or portion thereof (e.g., to allow easier mapping of coordinates in the collage to original photographs), xy-coordinates, and xy+time coordinates. In one implementation, a location of a photograph in the rendered collage is determined by matching the photograph's visual data against the rendered collage's visual data using any known technique.

In one implementation, the personalized social-based data includes one or more hotspots configured to occur at one or more predetermined locations (e.g., based on the default attribute component 950 or an existing hotspot area definition). In one implementation, the collage generator component 980 ensures that an entity corresponding to at least one of the hotspots appears at, or adjacent to, the predetermined location.

In one implementation, the personalized social-based data includes one or more hotspots not configured to occur at a predetermined location in the rendered collage, but configured to occur in relation to an entity (e.g., show the hotspot next to either a specific picture, one of a particular set of pictures, any picture of Uncle Frank, etc.). In this example, the collage generator component 980 may configure none, one, or more such hotspots to be displayed based on a hotspot display parameter. Examples of a hotspot display parameter include whether a corresponding entity will be visible in the collage, whether a corresponding entity will be in an exclusion area, and whether the hotspot can display annotations without overlapping an exclusion area.

The resulting collage definition may be an executable that displays the photomontage, other image, video, or combinations thereof. The resulting collage definition may be a data structure that causes an executable to render the collage. The resulting collage definition may be an interpreted data structure, such as a SILVERLIGHT application stored on computer readable storage media, which includes one or more combinations of photos, videos, and transition effects. The resulting collage definition may be a photomontage, other image, video, or combinations thereof.

As used herein, a rendered collage means a displayed composition made up of a plurality of different multimedia files, such that multiple of the different multimedia files are displayed simultaneously. For example, a digital photomontage is a collage of multiple digital photographs showing portions of multiple digital photographs simultaneously. A digital video collage is a collage of multiple video segments, where multiple such video segments are showing simultaneously. Similarly, a multimedia collage is a collage of multiple multimedia files showing portions of multiple of the multimedia files simultaneously.

When generating a collage definition, the collage generator component 980 may be configured to result in a collage definition where the most socially interesting photographs are not obstructed when displayed for the social networking participant 190. For example, the collage may be generated based on an exclusion mask 1001 (See FIG. 10 and FIG. 11). As an example, the collage generator component 980 may be configured to prefer photographs that do not result in faces in the exclusion mask 1001, or to prefer photographs resulting in faces outside the exclusion mask 1001, or to prefer photographs with a high social relevance score as determined by a scorer component 910 for display outside the exclusion mask 1001.

By ensuring these predetermined areas (e.g., the exclusion mask) are free of the most socially interesting photographs, the customization component ensures that areas most likely to be of interest to the user will remain visible without obscuring the user interface of the home page. Thus, rather than a non-socially-personalized image, the user may be presented with an interesting collage of photographs from their social network.

Accordingly, the collage generation component may provide replacement visual data that is both visually and socially appealing, customized to the social networking participant, and results in the more interesting visual data appearing unobstructed (or substantially unobstructed) when displayed to the user.

Figure 10:
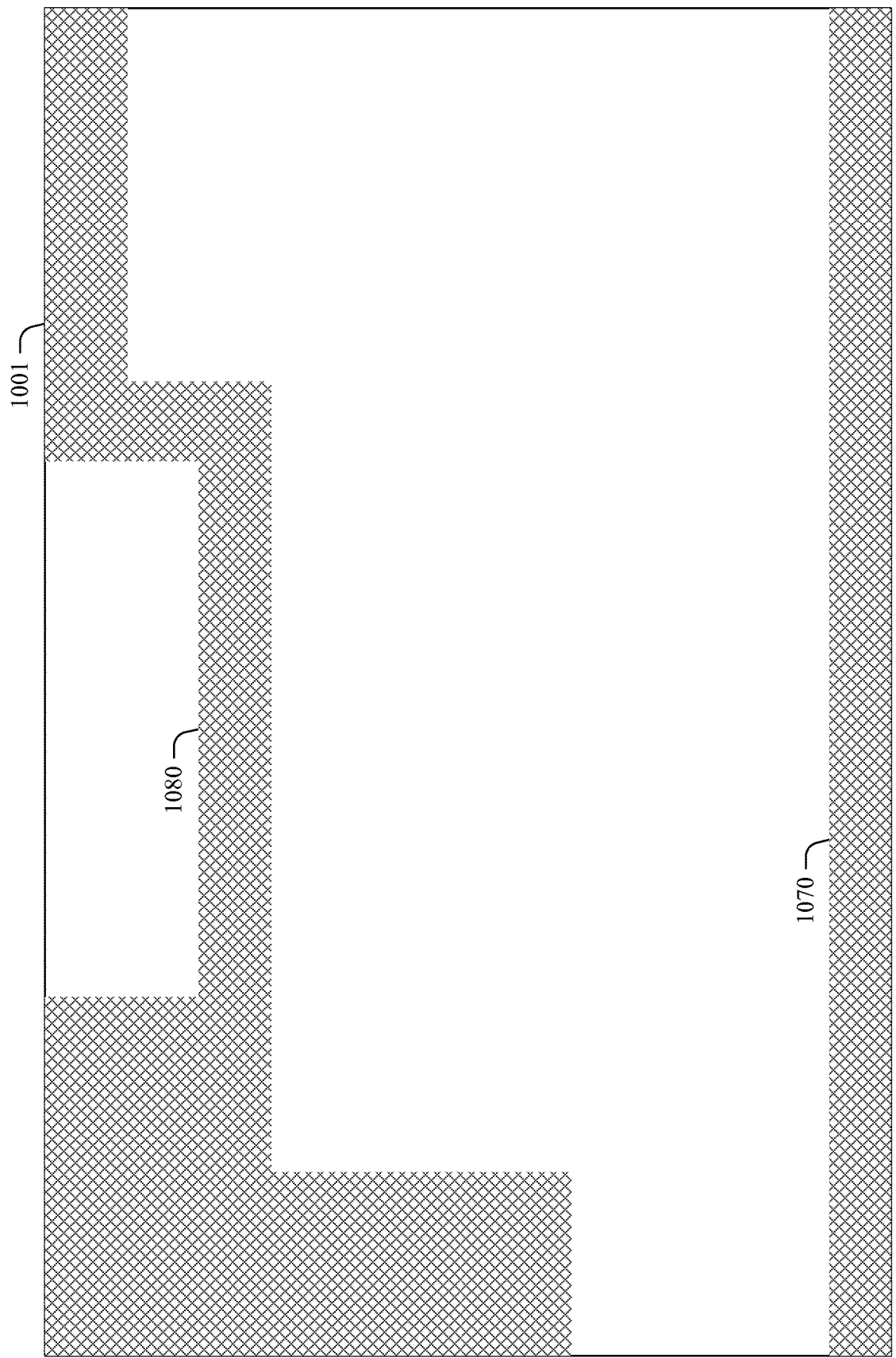
FIG. 10 illustrates an example generalized exclusion mask.

FIG. 10 illustrates an example generalized exclusion mask. The example exclusion mask 1001 shown is based on the example home page 600 shown FIG. 6. The example exclusion mask 1001 includes two discrete exclusion areas as cross-hatched areas 1070, 1080. The exclusion area 1080 can be determined based on the home page 600 elements 602, 620, 630, 642, 644, 646, 652, 654, 656, 658, 604, 606, 608, 612, and 614. The exclusion area 1070 can be determined based on the home page 600 elements 672, 674, 676, 682, 684, 686, 692, 694, and 696. In one implementation, the exclusion mask and/or its inverse may be a default element attribute.

In one implementation, there may be multiple exclusion masks. For example, a second example exclusion mask (not shown) may indicate where a face, a rendered hotspot, or a rendered annotation will be. In one implementation, each exclusion mask has identical priority. In one implementation, at least one exclusion mask has a lower priority than a second exclusion mask. For example, an exclusion mask based on the home page 600 elements may have a high priority of "Required", while an exclusion mask based on faces detected in photomontage may have a lower priority of "avoid if possible". In one implementation, the exclusion mask priority is used as part of a positional parameter to determine the location of a hotspot or annotation.

Figure 11:
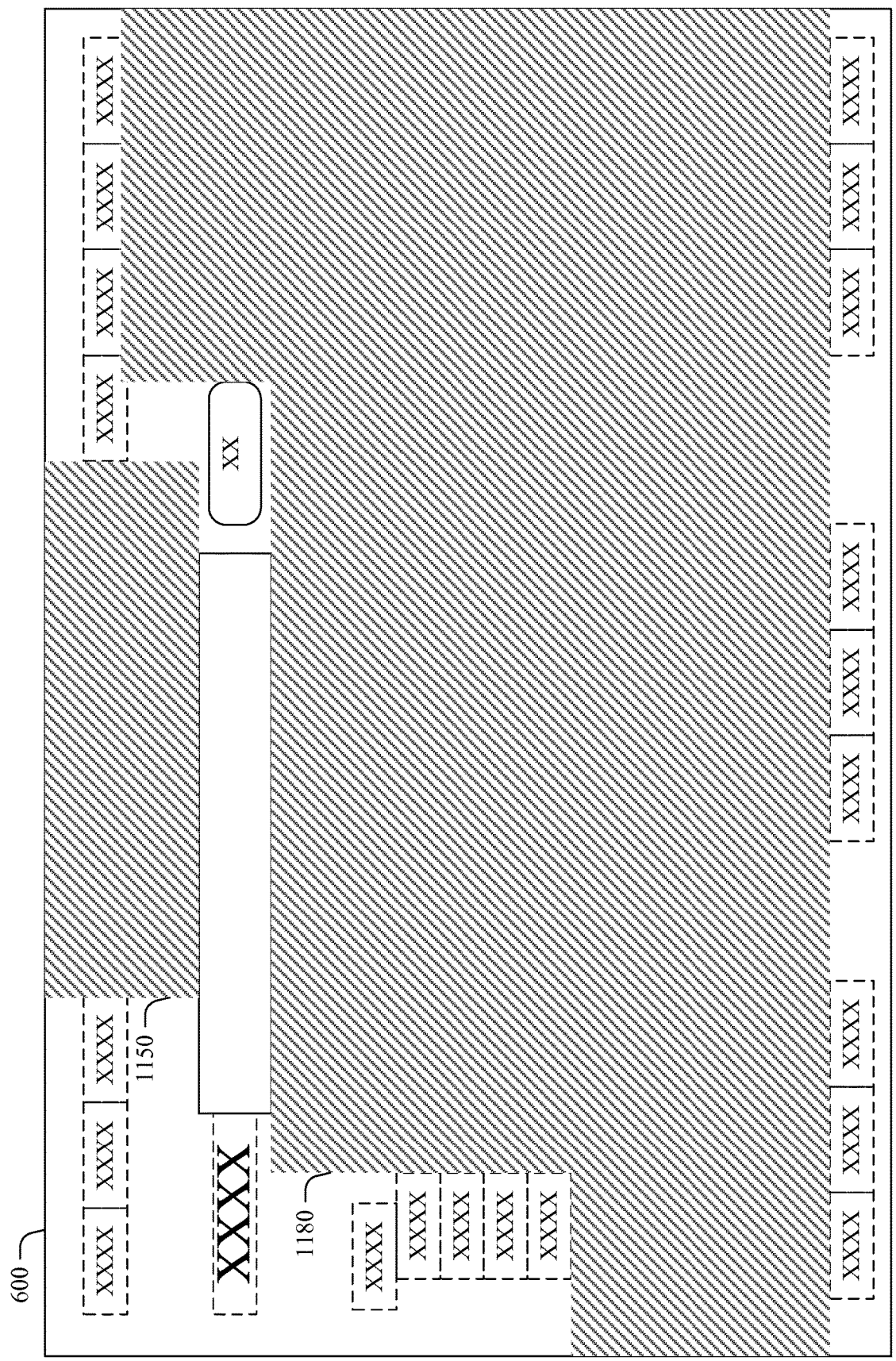
FIG. 11 illustrates the home page of FIG. 6 with the exclusion mask of FIG. 10 inverted and overlaid upon the home page of FIG. 6.

FIG. 11 illustrates the home page of FIG. 6 with the exclusion mask 1001 of FIG. 10 inverted and shown overlaid as diagonal line filled areas 1150, 1180. As can be seen, items displayed outside the exclusion mask areas 1070, 1080 (i.e. within the inverted exclusion mask areas 1150, 1180) will not obstruct or be obstructed by the home page elements as shown in FIG. 6.

Figure 12:
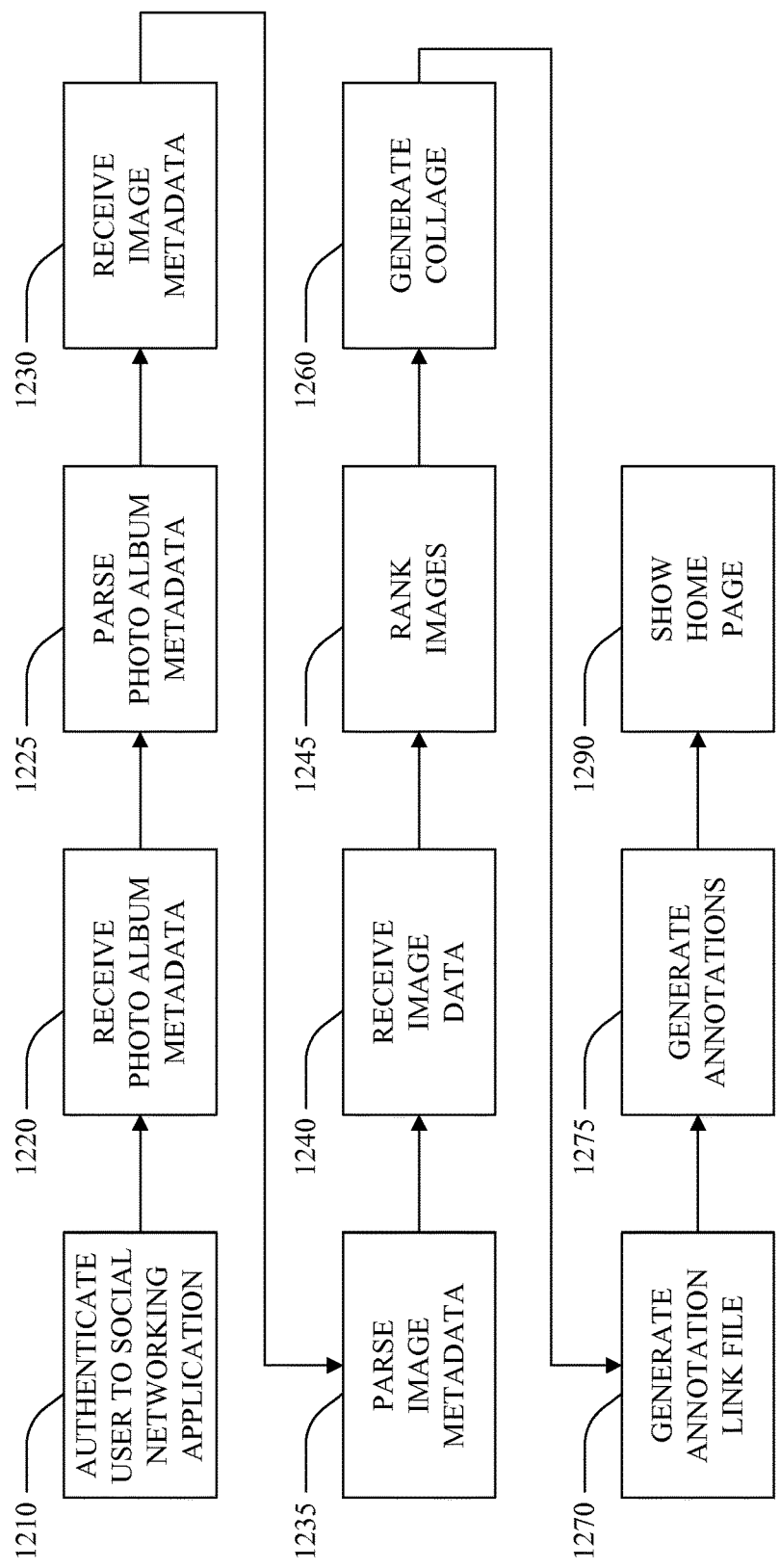
FIGS. 12-14 each illustrate an example generalized operational flow including various operations that may be performed when providing personalized social-based data for a social networking participant.

FIG. 12 illustrates an example generalized operational flow including various operations that may be performed when creating personalized social-based data for a user.

In some implementations or scenarios, a user may be authenticated to a social networking application, as in authenticating operation 1210. Photo album metadata may be available to the authenticated user, such as a name of the photo album, a social networking identity who generated the album, or the number of photographs in the album, and links to the image metadata for images included in the album. The photo album metadata may be received as in receiving operation 1220. A receiving operation (including 1220, 1230, and others) may include receiving data responsive to a request for the data ("pull"), receiving data in response to it being sent without a request for the data ("push"), receiving data on a regular basis, and/or receiving data in response to an event ("event driven").

The photo album metadata may be parsed to determine image metadata to receive, as in parsing operation 1225. For example, the parsing may determine a set of the photographs in the album which were not previously displayed to the user. Image metadata may be received as in receiving operation 1230. The image metadata may include metadata such as GPS data, date/time the image was uploaded or last updated, model of camera taking a photograph, color balance, color depth, number of comments, specific comments, identities of users who like the photo, or an indicator which identifies the actual image data.

The image metadata may be parsed to determine actual image data to retrieve, as in parsing operation 1235. The actual image data to retrieve may be indicated by an image data locator. Examples of image data locators include a uniform resource identifier (URI), uniform resource name (URN), or uniform resource locator (URL) through which the actual image is available, a unique image identifier, such as one enabling receiving from a known location, a known service, or which corresponds to a locally cached copy of the actual image data, and any other method of enabling receipt of the corresponding actual image data.

The retrieved images may be ranked according to any suitable factor. These factors may include factors to generate a socially relevant and/or visually appealing collage, as in ranking operation 1245. Each of parsing operation 1225 and 1235, and ranking operation 1245 may also include parsing the received data to obtain one or more potential entities, and may base their operations on those one or more potential entities.

A socially relevant collage may be generated based on one or more of the ranked images, as in generating operation 1260. Based on the images used in the socially relevant collage, an annotation link file may be generated, as in generating operation 1270. The annotation link file may indicate the one or more ranked images used in the socially relevant collage, and where one or more of the images are displayed in the socially relevant collage.

One or more annotations for the collage may then be generated, as in generating operation 1275. The collage may be used to displace a default image in a home page, such as a background image, and the annotations may be displayed in combination with the displaced background image, as in displaying operation 1290. Thus, a socially relevant collage is incorporated into a social-based personalized homepage.

Figure 13:
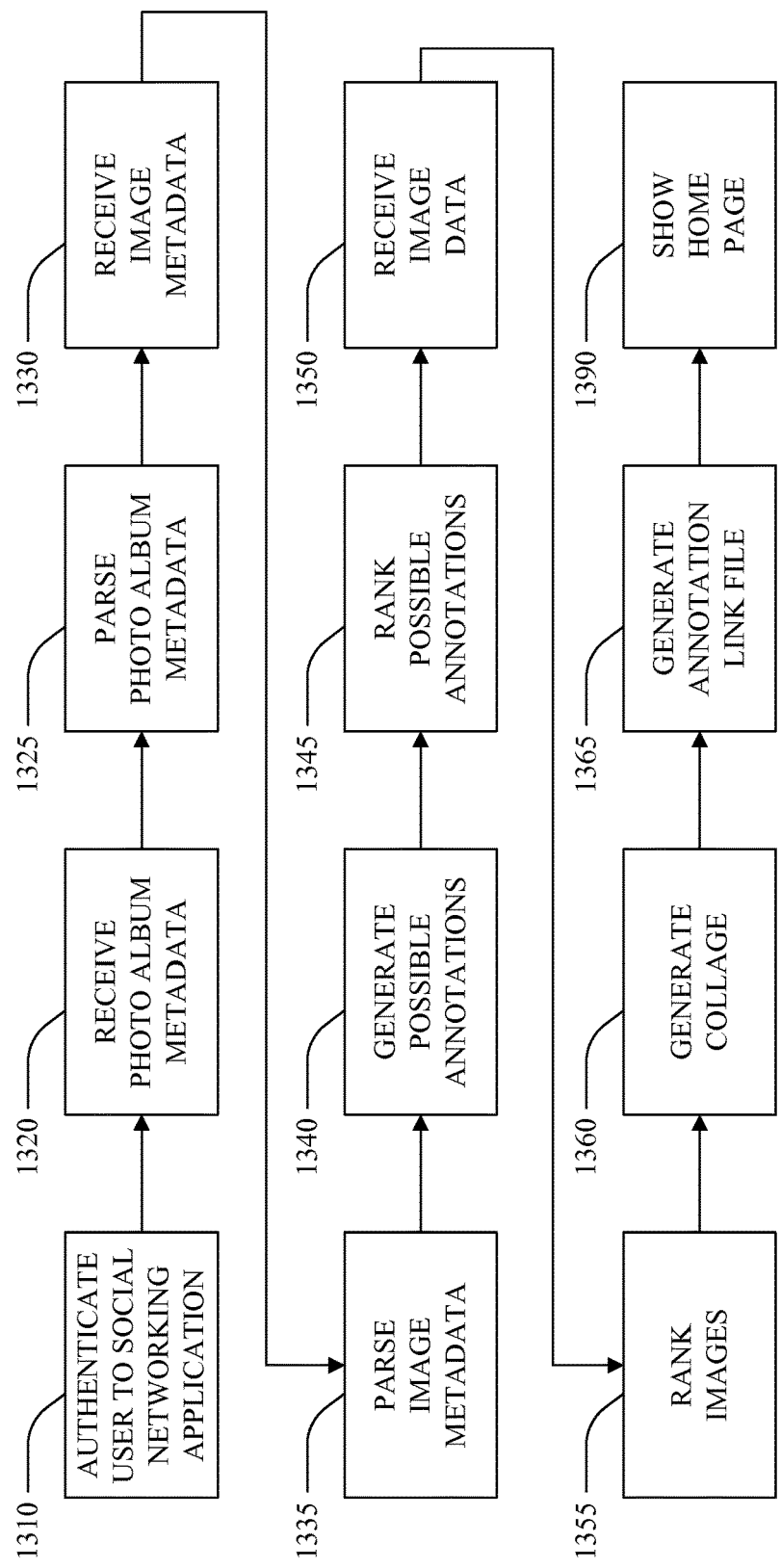

FIG. 13 illustrates an example generalized operational flow including various operations that may be performed when creating personalized social-based data for a user.

In some implementations or scenarios, a user may be authenticated to a social networking application, as in authenticating operation 1310. Photo album metadata available to the authenticated user may be received, as in receiving operation 1320. The photo album metadata may be parsed to determine image metadata to receive, as in parsing operation 1325.

Image metadata may be received as in receiving operation 1330. The image metadata may be parsed to determine actual image data to retrieve, as in parsing operation 1335.

One or more possible annotations may then be generated, based on the received data, as in generating operation 1340. The possible annotations may then be ranked, as in ranking operation 1345. The possible annotations may be ranked based on relevance and predicted accuracy. In one implementation, the annotations are ranked based on the probability of determining a correct disambiguated entity associated with the annotation. In one implementation, the annotations are ranked based on an advertising value associated with the determined entity.

Based on the ranked possible annotations, a non-empty subset of the images may be selected, received, and ranked, as in receiving operation 1350 and ranking operation 1355. In one implementation, receiving operation 1350 and ranking operation 1355 repeat until sufficient images with disambiguated entities are received to generate a visually appealing collage. For example, the receiving operation 1350 may receive a group of at least one image and include the newly received group in the cumulative group of received images until sufficient images are received. In another implementation, a predetermined multiple of the number of images to be displayed in the collage are received.

The retrieved images may be used to generate a collage, as in generating operation 1360. In one implementation, an annotation link file is generated, as in generating operation 1365. In one implementation, the annotations are then correlated with the images in the collage. The resulting collage and/or annotations may then be used to replace at least one default element in a home page. The resulting customized socially relevant home page may then displayed, as in displaying operation 1390, or stored in a computer readable storage medium for later use by the user.

Figure 14:
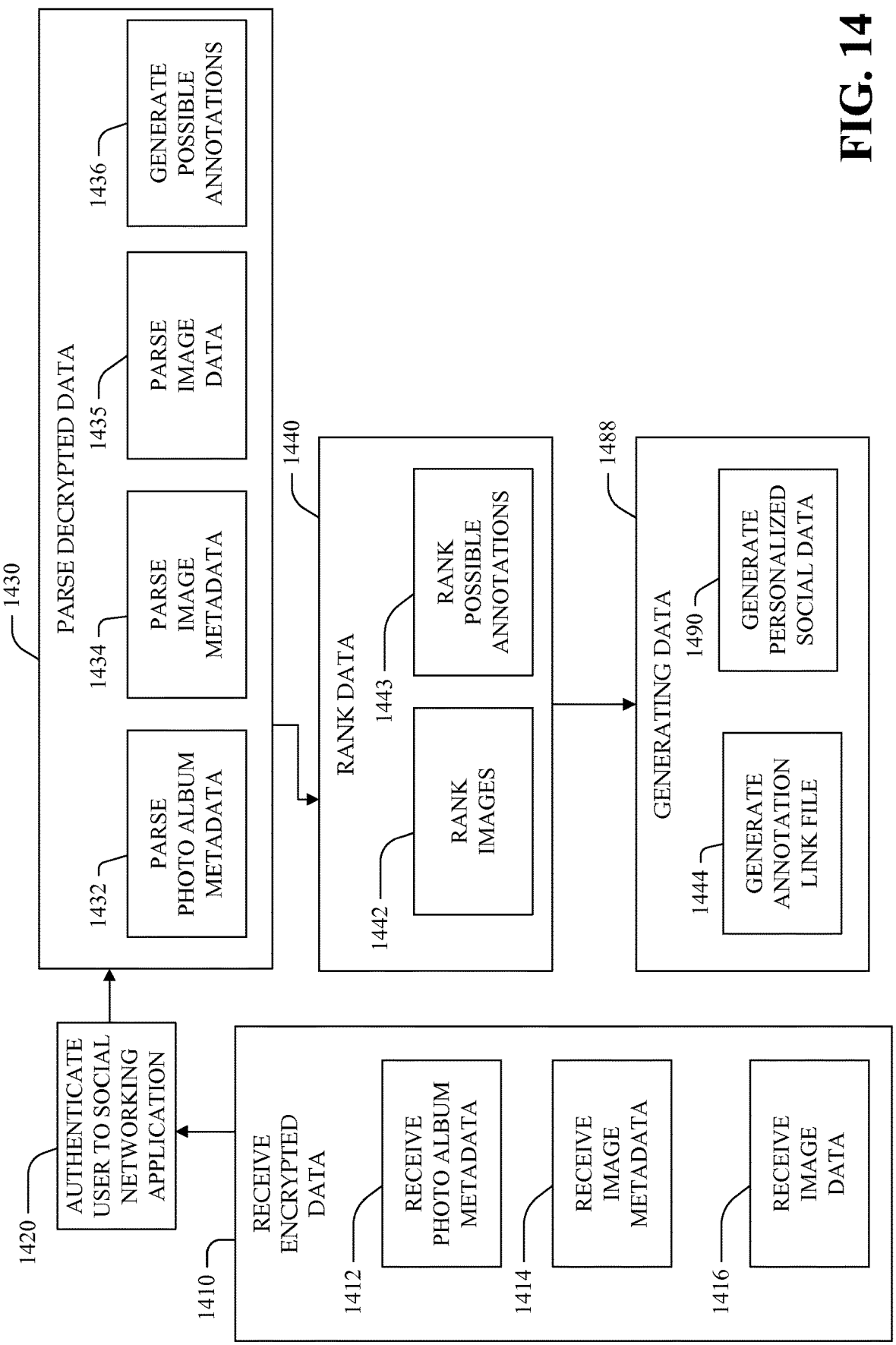

FIG. 14 illustrates an example generalized operational flow including various operations that may be performed when creating personalized social-based data for a user.

In this example, data are received prior to a user authenticating to a social networking application, as in receiving operation 1410. This may include the operations of receiving photo album metadata as in receiving operation 1412, image metadata as in receiving operation 1414, and image data as in receiving operation 1416. At least portions of these received data may be are received in encrypted form, preventing parsing of the encrypted data until they are decrypted. These received data may be related to many or all users of a social networking application, thus providing a local cache of at least some of the data.

A user may authenticate to the social networking application, as in authenticating operation 1420. In response to the authentication, the social networking application may enable access to those portions of the encrypted data the authenticated user normally has access to. For example, a decryption key (or other secret required to determine a decryption key) may be provided. An indication of which of the received data may be decrypted with each provided decryption key may be provided. The user's social networking data may thus be decrypted for use.

Any content which may be decrypted and is within the user's social networking data then be parsed, as in parsing operation 1430. The parsing may occur in parallel on multiple pieces of data. The photo album metadata may be parsed, as in parsing operation 1432. The image metadata may be parsed as in operation parsing 1434. The image (or other multimedia file) data may be parsed, as in parsing operation 1435. Possible annotations may be generated, as in parsing operation 1436.

Based on the result of at least one of these operations, the data may be ranked as in ranking operation 1440. The ranking may occur in parallel on multiple pieces of data. The images may be ranked, as in ranking operation 1442. The possible annotations may be ranked, as in ranking operation 1443.

Based on the results of at least one of these operations, results may be generated, as in generating operation 1488. Personalized socially relevant data may be generated, as in generating operation 1490. An annotation link file may be generated, as in generating operation 1444. It may not be possible to maximize the beneficial properties of all aspects of the personalized social-based data simultaneously. For example, the social relevance of images used, the social relevance of annotations used, and the visual appeal of a generated collage may have competing and incompatible results. An implementation may prefer to maximize one beneficial property at the expense of another beneficial property. For example, one implementation may give preference to the visual appeal of a resulting photomontage over a resulting social relevance, such as by adjusting scoring parameters or the comparison of corresponding scores.

Figure 15:
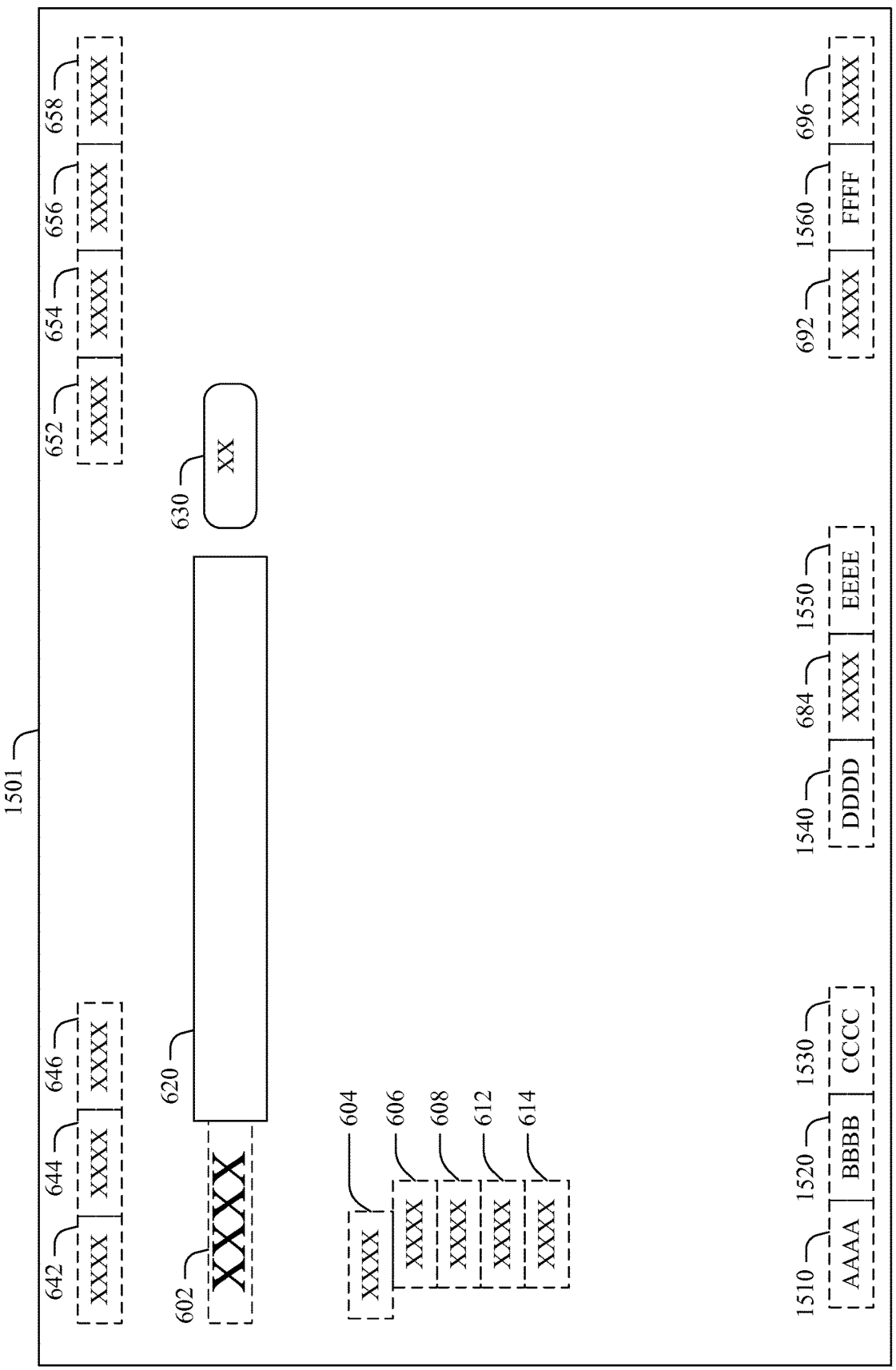
FIG. 15 illustrates an example generalized socially personalized home page based on the home page of FIG. 6.

FIG. 15 illustrates an example generalized socially personalized home page 1501 based on the home page 600 of FIG. 6. In this example, default elements 672, 674, 676, 682, 686, and 694 (collectively, displaced default elements) have been displaced by replacement elements 1510, 1520, 1530, 1540, 1550, and 1560 respectively (collectively, displacing elements). In one implementation, the displaced default elements may each be text. For example, element 672 may have been "Popular Seattle Restaurants", and displacing element 1510 may be "Friends' Recently Visited Restaurants".

Figure 19:
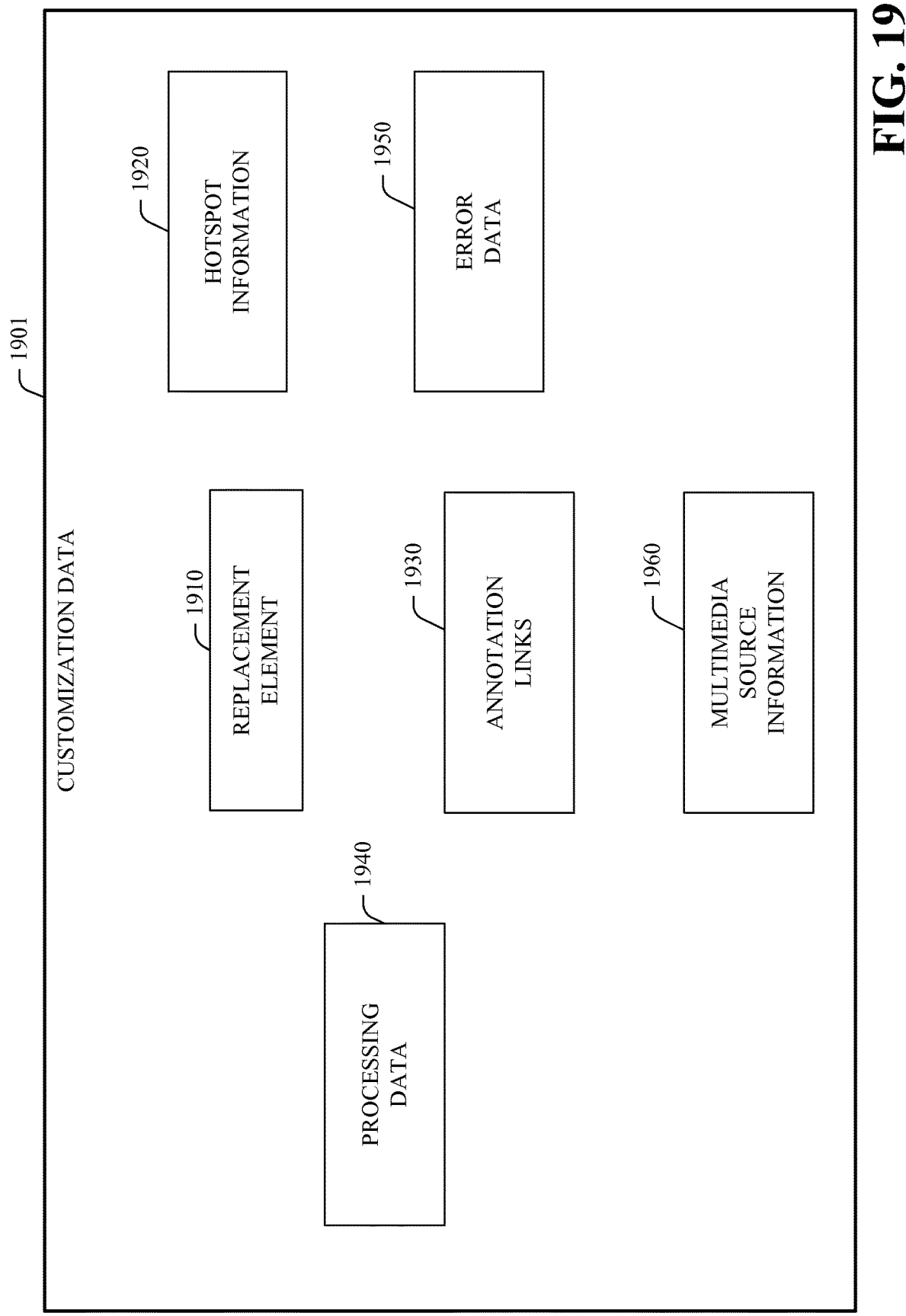
FIG. 19 illustrates a generalized example of customization data.

FIG. 19 illustrates generalized example set of data structures 1901 that may be generated by a customization component 150. In one implementation, the replacement element 1910 is generated by the collage definition generator component 980, and the hotspot information 1920 is generated by the hotspot generator component 960.

A replacement element 1910 data structure may be an indicium of a file which a replacement element is based on. In one example, the replacement element 1910 includes an indicium of the replacement element. In one example, the replacement element 1910 is a file of the same type (e.g., JPG picture file) as the default element being replaced. In one example, the replacement element is a data structure to be interpreted during rendering, such as a SILVERLIGHT program stored on computer-readable storage media.

A hotspot information 1920 data structure may include an indicium of one or hotspot parameters.

An annotation links 1930 data structure may include an indicium (e.g., hyperlinks, image data locator, uniform resource indicator (URI), or other indicium) of a source multimedia file upon which the rendered replacement element is based. In one example, it includes a uniform resource locator (URL) that indicates the URL of a photograph rendered in a photomontage. In one example, it includes a URL of a social networking application page corresponding to an album that includes the photograph.

In one example, the annotation links 1930 data structure may allow a user to interact with a rendered replacement element (e.g., a multimedia file in the replacement element). The interaction may include clicking on or hovering over the multimedia file. In one example, as a result of the user interaction, the user may be redirected to the multimedia file or album containing the multimedia file on the social networking application. In one example, a hovering interaction on a photograph in a photomontage will cause an invisible indicium of interest to occur. This indicium of interest may be provided to the customization component (e.g., load a 1×1 invisible GIF with a unique URI corresponding to the photograph, where the customization component interprets the access of that unique URI an interest in the photograph). In one implementation, the customization component 150 may use this indicium of interest to further refine its scorer component 910.

A processing log 1940 data structure may indicate statements describing intermediate execution acts of the customization component. In one example, this may include binary or text data corresponding to what are commonly referred to a "debug output" from a program. In one implementation, this is a separate text file.

An error log 1950 data structure may indicate non-correctable errors that occurred when executing one or more acts of the customization component. In one example, this may include errors that caused the customization to fail, such as an indicium of an unhandled .NET exception. In one example, this may include error that, while not correctable, did not prevent the customization to fail. For example, an error reading a single multimedia file could not be corrected to read the file, but the file could be ignored and the results generated from other files.

A source information 1960 data structure may include a source information indicium corresponding to files used in the generating process. Examples of source information indicium include an indicium of user generated content that will be rendered in the replacement element, indicium of previously or partially completed customization, and indicium of social networking application actions that correspond to a user generated content that will be rendered in the replacement element.

For example, the indicium may be an image URL pointing to the social networking application 150 page containing a photo, a URL to a the social networking application 150 page of the album containing the photo, a URL that indicates a preference for a photo, and an indicium of a previously extracted entity for a user generated content.

In one implementation, the customization component generates (i) a picture file as a replacement element 1910, (ii) a single text file that includes an x-y coordinate location for a hotspot, an annotation phrase for the hotspot, an action text for the hotspot, and a hyperlink corresponding to an action text for the hotspot (e.g., link to query a search engine about the action text as relates to the entity), with the single text file being both an annotation links file 1930 and as a hotspot information 1920 data structure, (iii) a text file with redirected debug output as a processing log 1940 data structure, (iv) a file including a link to a photograph used in a photomontage as a source information 1960 data structure, and (v) when an exception occurs, an XML description of the exception.

Continuing the description of this implementation, the rendering of the personalized data bases the rendering on the picture file and the single text file. The rendering may allow the user to right-click on the picture file to indicate an interest in (e.g., thumbs-up) a portion of the picture file (e.g., the photograph in that portion of the picture). The processing log and error log may be stored for later analysis.

Figure 20:
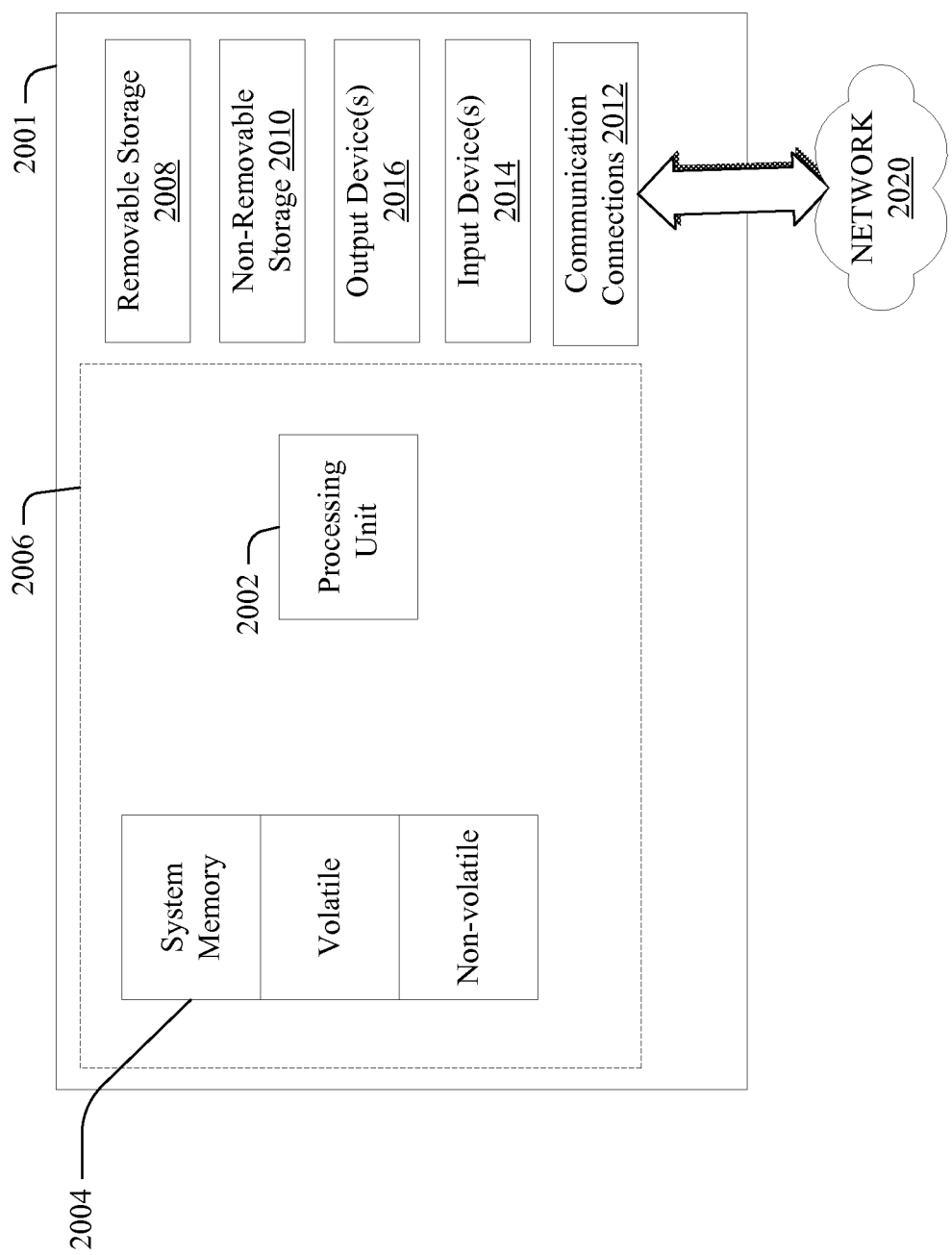
FIG. 20 illustrates a generalized example system for implementing a social home page.

FIG. 20 illustrates a generalized example system for implementing a social home page. The operating environment of FIG. 20 is only one example of a suitable operating environment and is not intended to suggest any limitation as to the scope of use or functionality of the operating environment. Other well-known computing devices, systems, environments, and/or configurations that may be suitable for use with the system described herein include, but are not limited to, personal computers, server computers, hand-held or laptop devices, multiprocessor systems, micro-processor based systems, programmable consumer electronics, network personal computers, mini computers, mainframe computers, cellphones, distributed computing environments that include any of the above systems or devices, and the like.

Although not required, the image processing system will be described in the general context of computing device executable components, such as executable instructions encoded on a computer readable storage medium that, when executed by the computing device, cause the computing device to perform acts through a sequence of steps. Unless explicitly indicated as requiring user supervision, each of these acts may occur without user supervision (e.g., an explicitly recited request to perform a task results in a series of autonomous acts by the computing device). The computing device executable instructions can include program modules, and be executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 20, an example system for implementing the system includes a computing device, such as device 2001. In its most basic configuration, device 2001 typically includes at least one processing unit 2002 and at least one computer readable storage medium, such as memory 2004. Depending on the exact configuration and type of device, memory 2004 may be volatile (such as RAM), non-volatile (such as ROM, flash memory, etc.) or some combination of the two.

Additionally, device 2001 may also have additional features and/or functionality. Device 2001 may include additional computer readable storage medium (e.g., removable and/or non-removable), for example magnetic disks, optical discs, or tape. Such additional storage is illustrated in FIG. 1 by removable storage 2008 and non-removable storage 2010. Examples of computer readable storage media include volatile and nonvolatile, removable and non-removable media implemented in any method or technology for storage of information such as computer readable instructions, data structures, program modules, or other data. Computer readable storage media is explicitly defined to include only patentable subject matter as defined by 35 USC § 101. Memory 2004, removable storage 2008, and non-removable storage 2010 are all examples of computer readable storage media. Additional examples of computer readable storage media are RAM, ROM, EEPROM, flash memory and other memory technology, CD-ROM, digital versatile disks (DVDs) or other optical storage, magnetic cassettes, magnetic tape, magnetic disk storage, magnetic storage devices, and any other medium which can be used to store the desired information and which can be accessed by device 2001. Any such computing device readable storage media may be part of the device 2001.

Although the term "file" may be used throughout the application, a person having ordinary skill in the art will recognize that a file may mean any data resource, regardless of whether it is stored in a structured file system, file, multiple correlated files (e.g., a ZIP file with multiple parts), RAM, or other computing device readable storage medium.

Device 2001 may also contain communication connection(s) 2012 that allow the device 2001 to communicate with other devices, such as with other computing devices through network 2020. Communications connection(s) 2012 is an example of communication media. Communication media typically embodies computer readable instructions, data structures, program modules or other data in a modulated data signal such as a carrier wave or other transport mechanism and includes, without limitation, any information delivery media. The term 'modulated data signal' means a signal that has one or more of its characteristics set or changed in such a manner as to encode information in the signal. Examples of communication media are wired media such as a wired network or direct-wired connection, and wireless media such as acoustic, radio frequency, infrared, and other wireless media. The term computer readable media as used herein includes both storage media and communication media.

Those skilled in the art will realize that storage devices utilized to store program instructions can be distributed across a network. For example a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor, programmable logic array, electrically programmable read-only memory (EPROM), TINKERTOY construction sets (see, for example, the computing device called "read head"), erasable EPROM (EEPROM), or the like.

Device 2001 may also have input device(s) 2014 such as keyboard, mouse, pen, voice input device, touch input device, laser range finder, infra-red cameras, video input devices, and/or any other input device. Output device(s) 2016 such as one or more displays, speakers, printers, and/or any other output device may also be included.

Figure 21:
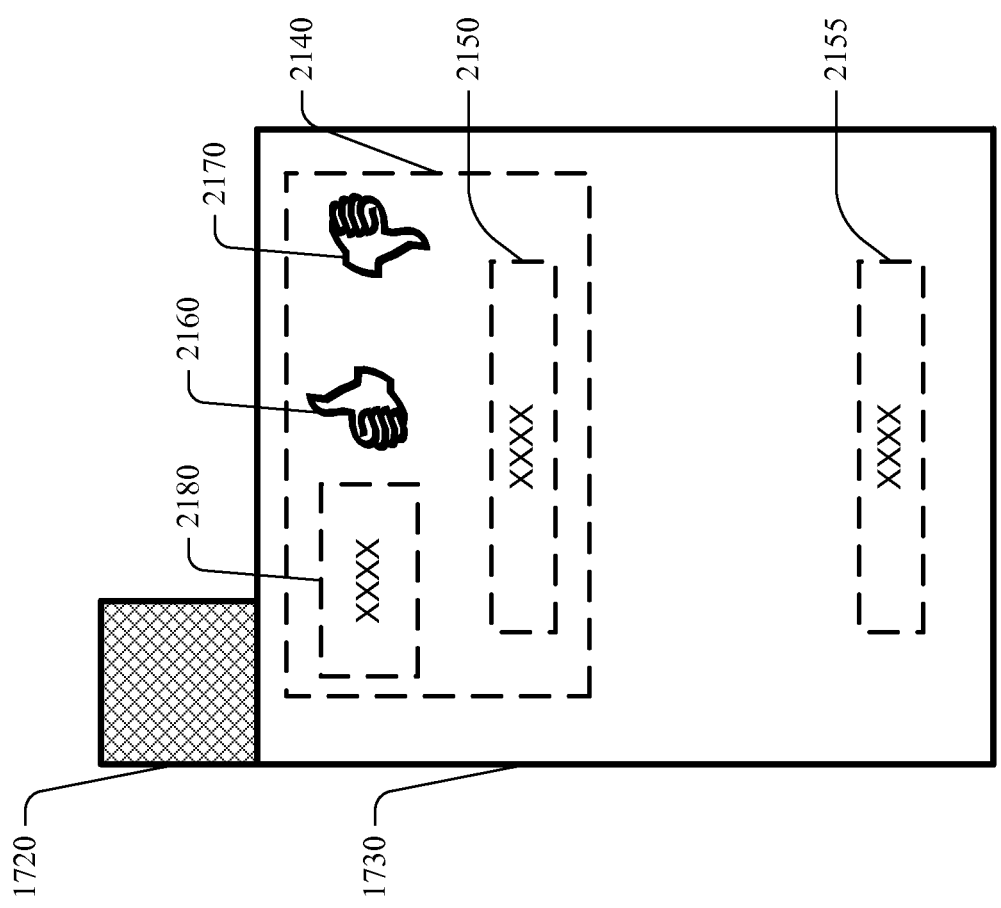
FIG. 21 illustrates a generalized example activated hotspot and annotation display area.

FIG. 21 illustrates a generalized example hotspot 1720 and annotation display area 1730. An annotation display area 1730 may include an annotation (e.g., 2150, 2155), a user preference indicator (e.g., 2160, 2170), and/or a user preference target indicator (e.g., 2180). In the example illustrated, the user preference indicators 2160, 2170, user preference target indicator 2180, and annotation 2150 are rendered to indicate a grouping 2140. This grouping 2140 may be used to indicate the preference indicators 2160, 2170 correspond to the specific annotation 2150. The grouping 2140 may be indicated in any suitable manner, such as visual framing, spacing indicating a group, alternating background colors, etc. In one example, the grouping 2140 may be equivalent to or include the entire annotation display area 1730.

A user preference indicator 2160 may be configured to respond to a user interaction by providing a user preference indicium. A user preference indicium may include a user preference indicium target. Examples of user preference indicium targets include a social network indicium, a multimedia indicium, an entity indicium, a comment indicium, a social networking identity indicium, and a photograph indicium. For example, a user may click on a user preference indicator 2160 to indicate they like the annotation rendered for a hotspot.

The user preference target indicator 2180 may be configured to indicate a user preference indicium target corresponding to one or more user preference indicators (e.g., 2160, 2170). In one example, the user preference target indicator 2180 allows the user to select a user preference indicium target value (e.g., from a drop-down list or other UI). In one example, the user preference target indicator for the hotspot has a static predetermined value.

In one implementation, the scorer component 910 bases a score upon a user preference indicium. As an example, the user preference indicator 2160 may be configured to retrieve a URL (e.g., a 1×1 transparent GIF) upon clicking on the user preference indicator 2160. The customization component may interpret an indication of the retrieval of the URL (e.g., through the use of a unique URL for an extracted entity, hotspot definition, photograph, or parameter corresponding to the hotspot 2110) as an indicium that the user prefers or enjoys something corresponding to the annotation. In one example, when the user preference indicium is correlated to a user preference indicium target, the scorer component 910 may provide greater or lesser scores to according to the user preference indicium and user preference indicium target.

What is claimed is:

1. A method comprising computing device acts, the computing device acts comprising:
   in response to receipt of an indication that a social network participant has requested a search engine home page:
      identifying an image in social networking data of the social network participant, the social networking data uploaded to a social networking application, the image uploaded to the social networking application by a contact of the social network participant in the social networking application;
      identifying a named entity that corresponds to the image based upon comments to the image in the social networking data;
      personalizing the search engine home page for the social network participant, wherein personalizing the search engine home page comprises constructing a collage of images for inclusion on the search engine home page, wherein the collage of images comprises a portion of the image;
      generating a hotspot for the search engine home page at a location of the portion of the image in the collage, wherein the hotspot, when activated, depicts a hyperlink that, when selected, causes a search engine corresponding to the search engine home page to execute a search for the named entity.

2. The method of claim 1, the computing device acts further comprising:
   identifying a plurality of possible annotation phrases based on the identified named entity;
   scoring the plurality of possible annotation phrases based on an annotation phrase parameter; and
   selecting an annotation phrase of the plurality of possible annotation phrases based on the scoring, wherein the personalizing of the search engine home page is based on the annotation phrase.

3. The method of claim 2, wherein the hotspot, when activated, depicts the annotation phrase.

4. The method of claim 1, the computing device acts further comprising:
   scoring a plurality of multimedia files based on a social interestingness metric; and
   selecting a multimedia file of the plurality of multimedia files for inclusion in the collage based on the scoring.

5. The method of claim 1, the computing device acts further comprising:
   identifying an annotation phrase within the social networking data, the annotation phrase included in a comment to the image in the social networking data, wherein the hotspot, when activated, depicts the annotation phrase.

6. The method of claim 5, the identifying of the annotation phrase comprising:

ranking possible annotation phrases from amongst a plurality of comments to the image in the social networking data based on at least one of the following annotation phrase parameters:
an amount of time that has passed since the plurality of comments was uploaded;
a difference between the comment and other comments in the plurality of comments;
whether the social network participant has previously read the comment;
an amount of time since the social network participant has read the comment;
explicit feedback provided on the comment by the social network participant;
relevancy of the comment to the named entity; and
a social networking identity of a commenter who set forth the comment.

7. The method of claim 1, the computing device acts further comprising:
   selecting a portion of a multimedia file of the social networking data, the portion of the multimedia file associated with the named entity; and
   including the multimedia file in the collage based on the portion of the multimedia file being associated with the named entity.

8. The method of claim 1, the computing device acts further comprising:
   identifying a first annotation phrase, the first annotation phrase associated with a portion of the image and the named entity;
   identifying a second annotation phrase from an external data source, the second annotation phrase associated with the named entity, wherein the hotspot, when activated, depicts a first annotation and a second annotation, the first annotation comprising the first annotation phrase, the second annotation comprising the second annotation phrase.

9. The method of claim 8, wherein the second annotation comprises a hyperlink pointing to a manufacturer of a product, the product associated with the named entity.

10. The method of claim 1, wherein the named entity is extracted from a comment in the comments.

11. The method of claim 1, wherein:
   the social networking data comprises a plurality of images uploaded to the social network application by a plurality of -contacts of the social network participant, and further wherein the collage comprises respective portions of the plurality of images.

12. A system, comprising:
   at least one processor; and
   memory that stores instructions that, when executed by the at least one processor, cause the at least one processor to perform acts comprising:
      in response to receiving an indication that a social networking participant has directed an application to load a search engine home page, personalizing the search engine home page for the social networking participant, wherein personalizing the search engine home page comprises:
         responsive to receiving the indication, constructing an image collage that comprises a plurality of images, an image in the plurality of images obtained from social networking data uploaded to a social networking application by a contact of the social networking participant;

identifying a named entity that corresponds to the image based upon comments to the image uploaded to the social networking application;

identifying an annotation phrase based on the named entity;

including the image collage in the search engine home page; and causing a hotspot to be included on the search engine home page at a location of the image in the image collage, the hotspot being an area on the search engine home page that displays the annotation phrase on the search engine home page when the hotspot is activated.

13. The system of claim 12, each image in the plurality of images obtained from the social networking data.

14. A method executed by a processor of a computing device, the method comprising:

responsive to receiving an indication that a social network participant has directed a client computing device to load a search engine home page, personalizing the search engine home page for the social network participant, wherein personalizing the search engine home page comprises:

including a collage in the search engine home page, wherein the collage comprises:

a portion of an image retrieved from a social networking application, the image uploaded to the social networking application by a contact of the social network participant in the social networking application; and a hotspot at a location of the portion of the image in the collage, wherein the hotspot, when activated, depicts additional information pertaining to the image; and responsive to personalizing the search engine home page, transmitting the search engine home page to the client computing device of the social network participant for display thereon.

15. The method of claim 14, further comprising:

identifying a named entity corresponding to the image based upon comments assigned to the image in the social networking application; and selecting the additional information for the hotspot based upon the named entity.

16. The method of claim 15, wherein the additional information comprises a hyperlink to a web page, the web page comprises information about the named entity.

17. The method of claim 15, wherein the additional information comprises a portion of a comment in the comments assigned to the image in the social networking application.

18. The method of claim 14, further comprising repeating the act of including for several images retrieved from the social networking application.

19. The method of claim 14, wherein the hotspot is activated in response to the social network participant interacting with the hotspot on the client computing device.

20. The method of claim 14, further comprising:

selecting the image for inclusion in the collage, wherein the image is selected based upon at least one of:

whether the social network participant had previously viewed the image by way of the social networking application; or a time when the image was uploaded to the social networking application.

* * * * *